(12) United States Patent  (10) Patent No.: US 8,572,316 B2
Shiga  (45) Date of Patent: *Oct. 29, 2013

(54) STORAGE SYSTEM FOR A VIRTUAL VOLUME ACROSS A PLURALITY OF STORAGES

(71) Applicant: Hitachi, Ltd., Tokyo (JP)

(72) Inventor: Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,093

(22) Filed: Dec. 13, 2012

(65) Prior Publication Data

US 2013/0103921 A1  Apr. 25, 2013

Related U.S. Application Data

(63) Continuation of application No. 13/396,048, filed on Feb. 14, 2012, now Pat. No. 8,370,573, which is a continuation of application No. 12/855,474, filed on Aug. 12, 2010, now Pat. No. 8,145,842, which is a continuation of application No. 12/007,225, filed on Jan. 8, 2008, now Pat. No. 7,802,053.

(30) Foreign Application Priority Data

Aug. 9, 2007 (JP) .................... 2007-207749

(51) Int. Cl.
 *G06F 12/00* (2006.01)
(52) U.S. Cl.
 USPC ............ 711/114; 711/154; 711/165; 711/170

(58) Field of Classification Search
 USPC .......................... 711/114, 154, 165
 See application file for complete search history.

(56) References Cited

U.S. PATENT DOCUMENTS

| 7,949,637 | B1 | 5/2011 | Burke |
| 2006/0242378 | A1* | 10/2006 | Kano ........................ 711/170 |
| 2006/0277386 | A1 | 12/2006 | Eguchi |
| 2007/0079099 | A1 | 4/2007 | Eguchi |
| 2007/0174574 | A1 | 7/2007 | Kano |
| 2007/0277017 | A1 | 11/2007 | Yamane et al. |
| 2008/0091748 | A1 | 4/2008 | Beniyama et al. |
| 2008/0104350 | A1 | 5/2008 | Shimizu et al. |
| 2008/0120459 | A1 | 5/2008 | Kaneda et al. |
| 2008/0126734 | A1 | 5/2008 | Murase |

(Continued)

FOREIGN PATENT DOCUMENTS

JP  2007-102455  10/2005

*Primary Examiner* — John Lane
(74) *Attorney, Agent, or Firm* — Volpe and Koenig, P.C.

(57) ABSTRACT

A first storage system includes a plurality of first storage devices and is coupled to a computer. A second storage system includes a plurality of second storage devices and is coupled to the first storage system. A first controller provides a thin provisioning logical volume (LU) to the computer. A second controller provides an external thin provisioning LU to the first storage system. The first controller provides pool areas associated with the thin provisioning LU, including a first pool area mapped to the external thin provisioning LU, and allocates the first pool area to a first region in the thin provisioning LU to store a write data to the first region in the thin provisioning LU. The second controller allocates at least one of a plurality of pool areas to store the write data to the first region in the thin provisioning LU.

18 Claims, 22 Drawing Sheets

(56) References Cited

U.S. PATENT DOCUMENTS

| | | |
|---|---|---|
| 2008/0184000 A1 | 7/2008 | Kawaguchi |
| 2009/0077327 A1 | 3/2009 | Hara |
| 2009/0144496 A1 | 6/2009 | Kawaguchi |
| 2009/0157956 A1 | 6/2009 | Kano |
| 2009/0172272 A1 | 7/2009 | Yamane et al. |
| 2009/0240880 A1* | 9/2009 | Kawaguchi .................. 711/114 |
| 2010/0011239 A1 | 1/2010 | Kawaguchi et al. |
| 2010/0057989 A1* | 3/2010 | Sakashita et al. ............. 711/114 |

* cited by examiner

| REAL LU ID 2061 | SIZE 2062 | ASSIGNED DEVICE TYPE 2063 | ASSIGNED DEVICE ID 2064 |
|---|---|---|---|
| 100 | 80GB | storage | S00 |
| 101 | 60GB | host | H00 |
| 102 | 40GB | pool | P00 |
| 103 | 40GB | unassigned | unassigned |
| 104 | 40GB | reserved | reserved |
| 105 | 40GB | pool | P01 |
| ... | ... | ... | ... |

206
REAL LU TABLE

*FIG. 4*

REAL LU CREATION SCREEN

STORAGE ID     ☐ — 3111
REAL LU ID     ☐ — 3112
SIZE     ☐ GB — 3113
☑ INHIBITION OF ASSIGNMENT TO OTHER STORAGE — 3114

[OK] 3115   311   [CANCEL] 3116

*FIG. 5*

| 2071 | 2072 |
| --- | --- |
| STORAGE ID | ADDRESS |
| S02 | 192.168.0.3 |
| ... | ... |

207

EXTERNAL STORAGE TABLE

FIG. 6

| 2081 | 2082 | 2083 | 2084 | 2085 | 2086 |
| --- | --- | --- | --- | --- | --- |
| EXTERNAL LU ID | EXTERNAL LU TYPE | SIZE | STORAGE ID | ASSIGNED DEVICE TYPE | ASSIGNED DEVICE ID |
| E00 | real | 80GB | S02 | pool | P00 |
| E01 | tp | 95GB | S02 | pool | P01 |
| ... | ... | ... | ... | ... | ... |

208

EXTERNAL LU TABLE

FIG. 7

| POOL ID (2091) | EXTERNAL LU TYPE (2092) | EXTERNAL LU SIZE (2093) | ASSIGNMENT THRESHOLD (2094) |
|---|---|---|---|
| P00 | real | 80GB | 1GB |
| P01 | tp | 80GB | 1GB |
| ... | ... | ... | ... |

209
POOL TABLE

*FIG. 8*

POOL CREATION SCREEN

STORAGE ID _____ 3121
POOL ID _____ 3122

EXTERNAL LU ASSIGNMENT POLICY
EXTERNAL LU TYPE  ● REAL LU    ○ TPLU    3123
EXTERNAL LU SIZE _____ GB  3124
ASSIGNMENT THRESHOLD _____ GB  3125

OK (3126)   CANCEL (3127)
312

*FIG. 9*

| TP LU ID (2101) | SIZE (2102) | POOL ID (2103) | ASSIGNED DEVICE TYPE (2104) | ASSIGNED DEVICE ID (2105) |
|---|---|---|---|---|
| T00 | 240GB | P00 | host | H00 |
| T01 | 60GB | P01 | unassigned | unassigned |
| T02 | 60GB | P00 | reserved | reserved |
| ... | ... | ... | ... | ... |

210
TPLU TABLE

*FIG. 10*

TPLU CREATION SCREEN

- STORAGE ID — 3131
- POOL ID — 3132
- TPLU ID — 3133
- SIZE [ ] GB — 3134
- ☑ INHIBITION OF ASSIGNMENT TO OTHER STORAGE — 3135

OK (3136)   CANCEL (3137)
313

*FIG. 11*

| TP LU ID | TP PAGE NUMBER | LU TYPE | STORAGE ID | LU ID | REAL PAGE NUMBER |
|---|---|---|---|---|---|
| T00 | TP00 | real | null | I00 | RP00 |
| T00 | TP01 | external | S02 | E00 | RP00 |
| T00 | TP02 | not accessed | null | null | null |
| ... | ... | ... | ... | ... | ... |

211
MAPPING TABLE

*FIG. 12*

| LU TYPE | STORAGE ID | LU ID | REAL PAGE NUMBER | STATUS |
|---|---|---|---|---|
| real | null | I00 | RP00 | Y |
| real | null | I00 | RP01 | N |
| ... | ... | ... | ... | ... |
| external | S02 | E00 | RP00 | Y |
| ... | ... | ... | ... | ... |

212 PAGE TABLE

*FIG. 13*

| STORAGE ID | ADDRESS |
|---|---|
| S00 | 192.168.0.1 |
| S01 | 192.168.0.2 |
| S02 | 192.168.0.3 |
| ... | ... |

303 STORAGE TABLE

*FIG. 14*

CAPACITY SHORTAGE DETECTION PROCESSING

TP PAGE WRITE PROCESSING

| TP LU ID | TP PAGE NUMBER | LU TYPE | STORAGE ID | LU ID | REAL PAGE NUMBER | LAST ACCESS TIME | NUMBER OF ACCESS |
|---|---|---|---|---|---|---|---|
| T00 | TP00 | real | null | I00 | RP00 | 2007/01/03 10:00 | 3 |
| T00 | TP01 | external | S02 | E00 | RP00 | 2007/03/15 06:10 | 10 |
| T00 | TP02 | not accessed | null | null | null | 2007/04/01 22:23 | 1350 |
| ... | ... | ... | ... | ... | ... | ... | ... |

211 MAPPING TABLE

FIG. 22

STORAGE SYSTEM FOR A VIRTUAL VOLUME ACROSS A PLURALITY OF STORAGES

CLAIM OF PRIORITY

This application is a continuation of U.S. patent application Ser. No. 13/396,048, filed Feb. 14, 2012, now issued as U.S. Pat. No. 8,370,573 on Feb. 5, 2013, which is a continuation of U.S. patent application Ser. No. 12/855,474, filed Aug. 12, 2010, now issued as U.S. Pat. No. 8,145,842 on Mar. 27, 2012, which is a continuation of U.S. patent application Ser. No. 12/007,225 filed Jan. 8, 2008, now issued as U.S. Pat. No. 7,802,053 on Sep. 21, 2010 and claims priority from Japanese patent application JP 2007-207749 filed on Aug. 9, 2007, the content of which is hereby incorporated by reference into this application.

BACKGROUND

This invention relates to a computer system having a plurality of storage systems, and more particularly, to a management method for data requested for data write in a thin provisioning volume.

Storage systems provide logical volumes (LUs) to host computers by statically assigning storage areas of disk drives. However, the LUs have the following problems.

For example, there is a problem in that a storage capacity of the disk drives assigned to the LUs becomes larger than a storage capacity to be actually used by the host computer, which is called over provisioning. This is because the storage capacity to be used by the host computer cannot be grasped with accuracy. Another problem resides in that operation costs required for changing LU capacities are high.

As a technique for solving the problems described above, there is known a technique called thin provisioning. The storage systems provide volumes realized by the thin provisioning (thin provisioning volume: TPLU) to the host computers. Thus, the host computers recognize the TPLUs provided by the storage systems as volumes having a storage capacity larger than that of the disk drives actually assigned to the respective TPLUs.

Upon reception of a write request to a TPLU from the host computer, the storage system dynamically assigns an unwritten storage area of a storage pool to the TPLU requested for data write.

In addition, JP 2007-102455 A discloses a technique of setting a storage pool including an LU of a storage system itself (internal LU) and an LU provided by an external storage system (external LU).

According to the technique disclosed in JP 2007-102455 A, the storage system can set a single storage pool including both the internal LU and the external LU. However, there has been a problem in that an administrator has to transfer data in units of TPLUs when a storage pool capacity becomes short, that is, capacity scalability of the storage system that provides the TPLU is low.

SUMMARY

A technique, which has been made in view of the above-mentioned problems and to provide a storage system having high capacity scalability, is provided.

A representative aspect of this invention is as follows. That is, there is provided a computer system, comprising: a first storage system coupled to a host computer and includes a first physical disk for storing data requested for data write by the host computer and a first disk controller for controlling to read/write data to the first physical disk; and a second storage system coupled to the first storage system and includes a second physical disk for storing data requested for data write by the first disk controller and a second disk controller for controlling to read/write data to the second physical disk. The second disk controller provides a second volume to the first disk controller. The first disk controller is configured to: define storage areas of the first physical disk as at least one first volume; define a first storage pool including the defined first volume and the provided second volume; provide to the host computer a first thin provisioning volume that is recognized as a volume having a capacity equal to or larger than a capacity of storage areas assigned from the first storage pool; and assign, when a write request to the first thin provisioning volume is received from the host computer, any of one of storage areas of the first volume and storage areas of the second volume, which are included in the first storage pool, to the first thin provisioning volume. The first thin provisioning volume is thus assigned with both the storage areas of the first volume and the storage areas of the second volume, which are included in the first storage pool.

According to the representative embodiment of this invention, the capacity expansion property of the storage system that provides the TPLU can be enhanced.

BRIEF DESCRIPTION OF THE DRAWINGS

The present invention can be appreciated by the description which follows in conjunction with the following figures, wherein:

FIG. 4 is a configuration diagram of the real LU table stored in the storage system in accordance with the first embodiment of this invention;

FIG. 5 is an explanatory diagram of a real LU creation screen displayed on the management terminal in accordance with the first embodiment of this invention;

FIG. 6 is a configuration diagram of the external storage table stored in the storage system in accordance with the first embodiment of this invention;

FIG. 7 is a configuration diagram of the external LU table stored in the storage system in accordance with the first embodiment of this invention;

FIG. 8 is a configuration diagram of the pool table stored in the storage system in accordance with the first embodiment of this invention;

FIG. 9 is an explanatory diagram of a pool creation screen displayed on the management terminal in accordance with the first embodiment of this invention;

FIG. 10 is a configuration diagram of the TPLU table stored in the storage system in accordance with the first embodiment of this invention;

FIG. 11 is an explanatory diagram of a TPLU creation screen displayed on the management terminal in accordance with the first embodiment of this invention;

FIG. 12 is a configuration diagram of the mapping table stored in the storage system in accordance with the first embodiment of this invention;

FIG. 13 is a configuration diagram of the page table stored in the storage system in accordance with the first embodiment of this invention;

FIG. 14 is a configuration diagram of the storage table stored in the management terminal in accordance with the first embodiment of this invention;

FIG. 22 is a configuration diagram of the mapping table stored in the storage system in accordance with a second embodiment of this invention.

DETAILED DESCRIPTION OF THE PREFERRED EMBODIMENTS

Hereinafter, embodiments of this invention will be described with reference to the drawings.

(First Embodiment)

Figure 1:
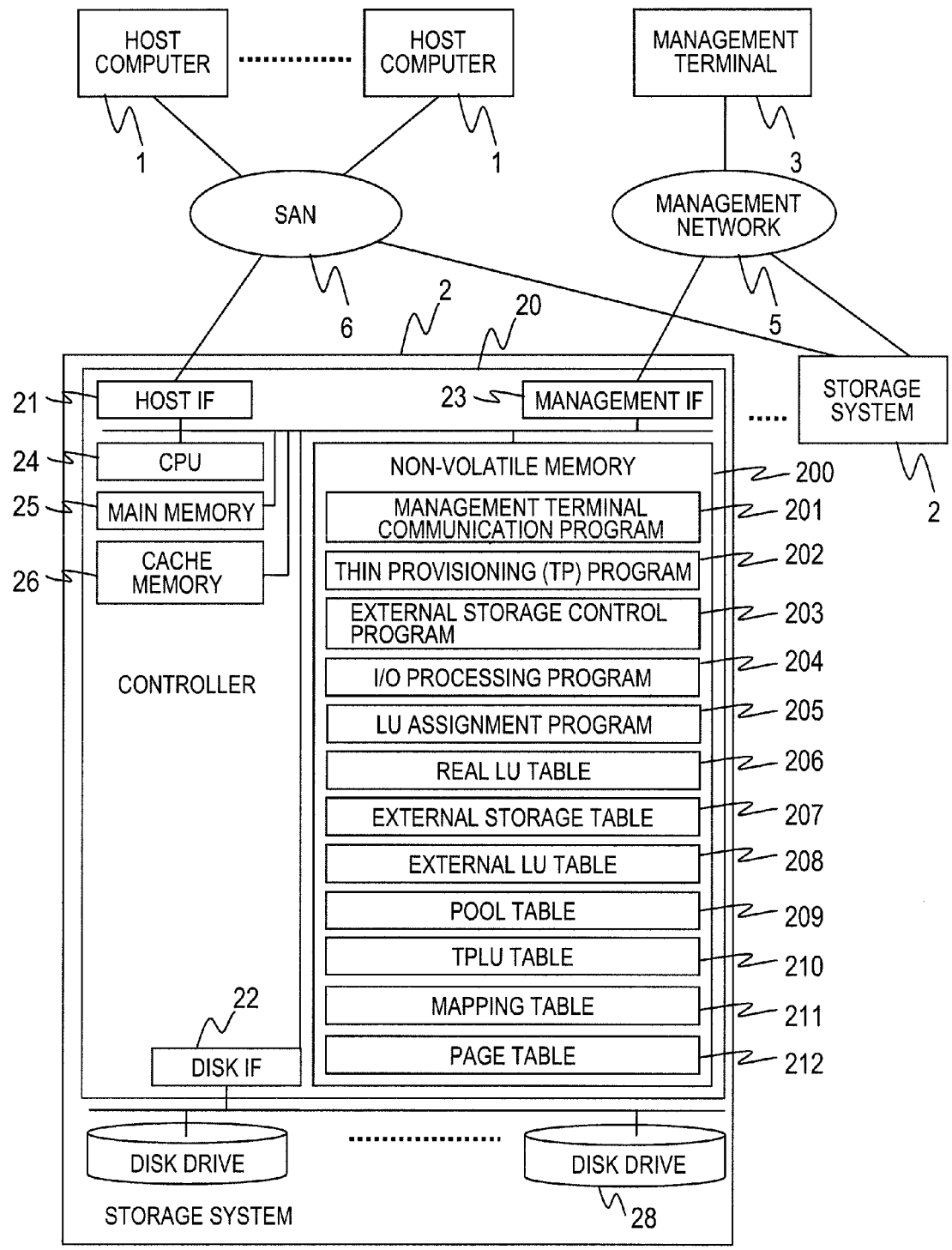
FIG. 1 is a block diagram showing a configuration of a computer system in accordance with a first embodiment of this invention.

FIG. 1 is a block diagram showing a configuration of a computer system according to a first embodiment of this invention.

The computer system includes host computers 1, storage systems 2, a management terminal 3, a management network 5, and a storage area network (SAN) 6. It should be noted that although the block diagram of FIG. 1 shows two host computers 1 and two storage systems 2, the host computer and the storage system may be provided in arbitrary numbers.

The SAN 6 is a network for connecting the host computers 1 and the storage systems 2. The management network 5 is a network for connecting the storage systems 2 and the management terminal 3.

The host computer 1 is a computer including a CPU (central processing unit), a memory, and an interface. The host computer 1 transmits a read request and a write request to the storage system 2.

The management terminal 3 is a computer for managing the storage system 2. It should be noted that the management terminal 3 will be described later in detail with reference to FIG. 2.

The storage system 2 includes a controller 20 and disk drives 28.

The controller 20 controls data read and data write with respect to the disk drives 28. In addition, the controller 20 sets storage areas of the disk drives 28 as one or more logical volumes (real LUs). The storage system 2 provides the real LU to the host computer 1 or the external storage system 2. It should be noted that the storage system 2 recognizes the real LU provided by the external storage system 2 as an external LU.

Further, the controller 20 includes a host interface (host IF) 21, a disk interface (disk IF) 22, a management interface (management IF) 23, a CPU 24, a main memory 25, a cache memory 26, and a non-volatile memory 200.

The host IF 21 is an interface connected to the host computer 1 via the SAN 6. The disk IF 22 is an interface connected to the disk drives 28. The management IF 23 is an interface connected to the management terminal 3 via the management network 5.

The CPU 24 executes various types of processing by executing programs stored in the main memory 25. The main memory 25 temporarily stores programs executed by the CPU 24, information required by the CPU 24, and the like. For example, the main memory 25 stores programs and various types of information including tables read from the non-volatile memory 200.

The cache memory 26 temporarily stores data written to the disk drive 28 and data read from the disk drive 28.

The non-volatile memory 200 stores programs and various types of information including tables. For example, the non-volatile memory 200 stores a management terminal communication program 200, a thin provisioning (TP) program 202, an external storage control program 203, an I/O processing program 204, an LU assignment program 205, a real LU table 206, an external storage table 207, an external LU table 208, a pool table 209, a Thin Provisioning LU table 210, a mapping table 211, and a page table 212.

The management terminal communication program 201 communicates with the management terminal 3. For example, the management terminal communication program 201 receives various requests from the management terminal 3 and executes processing according to the received requests.

The thin provisioning program 202 provides a volume realized by thin provisioning (thin provisioning volume: TPLU) to the host computer 1 or the external storage system 2. The storage system 2 recognizes the TPLU provided by the external storage system 2 as the external LU. In other words, the storage system 2 recognizes both the real LU and the thin provisioning LU provided by the external storage system 2 as the external LU.

The TPLU is recognized as a volume having a virtual capacity larger than a capacity of the storage areas actually assigned to the TPLU.

Upon reception of a write request to the TPLU, the thin provisioning program 202 assigns an unwritten storage area of a storage pool to the TPLU requested for data write in page units. It should be noted that the storage pool is composed of storage areas that can be assigned to the TPLUs. In addition, the unwritten storage area of the storage pool is a storage area that is not yet assigned to any of the TPLUs among all the storage areas included in the storage pool. Further, a page refers to a smallest unit of the storage area that is assigned to the TPLU, for example, a storage area of 64 Kbytes.

The external storage control program 203 communicates with the storage system (external storage system) 2 connected to the storage system 2 that is storing the external storage control program 203.

The I/O processing program 204 receives an I/O request with respect to the real LU or the TPLU. It should be noted that the I/O request is either a write request or a read request. When a write request is received, the I/O processing program 204 writes data requested for data write to the real LU or the TPLU. On the other hand, when a read request is received, the I/O processing program 204 reads data requested for data read from the real LU or the TPLU. Then, the I/O processing program 204 transmits the read data to a transmission source of the read request.

The LU assignment program 205 assigns, upon reception of an LU assignment request, either the real LU or the TPLU to the storage system 2 (external storage system 2) as the transmission source of the LU assignment request.

The real LU table 206 stores information on the real LU of the storage system 2 that is storing the real LU table 206. It should be noted that the real LU table 206 will be described later in detail with reference to FIG. 4.

The external storage table 207 stores information on the storage system 2 (external storage system 2) connected to the storage system 2 that is storing the external storage table 207. It should be noted that the external storage table 207 will be described later in detail with reference to FIG. 6.

The external LU table 208 stores information on LUs provided by the external storage system 2. In other words, the external LU table 208 stores information on the external LUs of the storage system 2 that is storing the external LU table 208. It should be noted that the external LU table 208 will be described later in detail with reference to FIG. 7.

The pool table 209 stores information on the storage pool set by the storage system 2 that is storing the pool table 209. It should be noted that the pool table 209 will be described later in detail with reference to FIG. 8.

The TPLU table 210 stores information on the TPLUs of the storage system 2 that is storing the TPLU table 210. It should be noted that the TPLU table 210 will be described later in detail with reference to FIG. 10.

The mapping table 211 stores locations at which data requested for data write to the TPLU of the storage system 2 that is storing the mapping table 211 is actually stored. It should be noted that the mapping table 211 will be described later in detail with reference to FIG. 12.

The page table 212 stores information on pages (real pages) included in the real LU or the external LU of the storage system 2 that is storing the page table 212. It should be noted that the page table 212 will be described later in detail with reference to FIG. 13.

Figure 2:
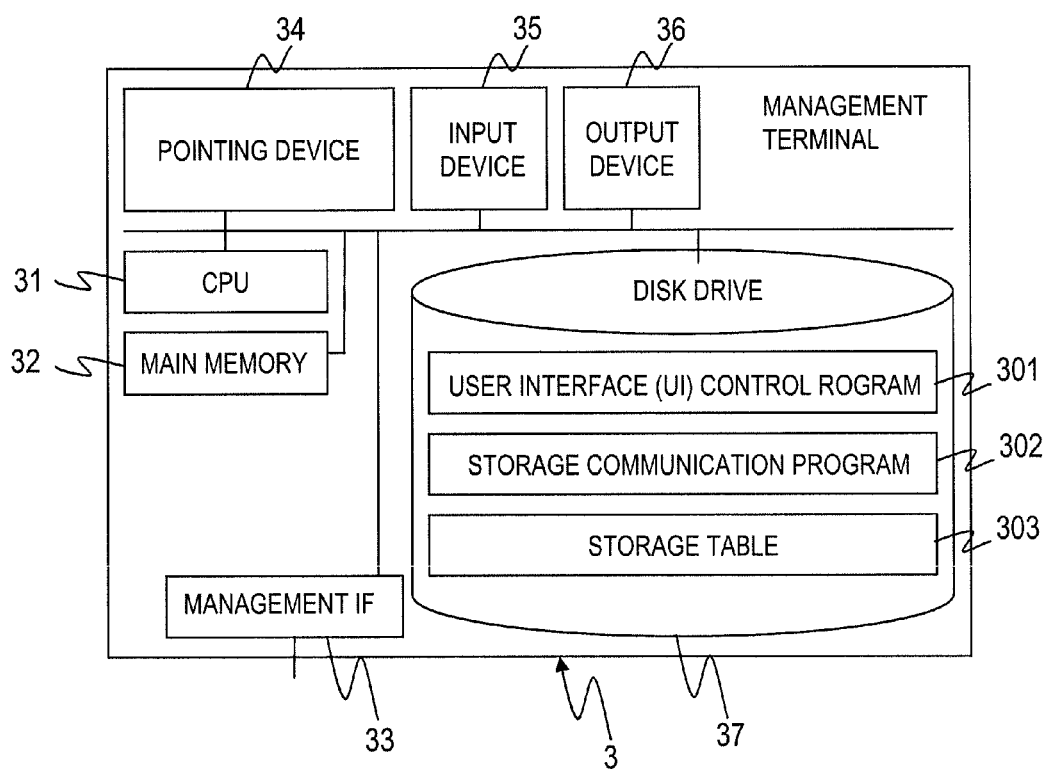
FIG. 2 is a block diagram showing a configuration of a management terminal included in the computer system in accordance with the first embodiment of this invention.

FIG. 2 is a block diagram showing a configuration of the management terminal 3 included in the computer system according to the first embodiment of this invention.

The management terminal 3 includes a CPU 31, a main memory 32, a management interface (management IF) 33, a pointing device 34, an input device 35, an output device 36, and a disk drive 37.

The CPU 31 executes various types of processing by executing programs stored in the main memory 32.

The main memory 32 temporarily stores programs executed by the CPU 31, information required by the CPU 31, and the like. For example, the main memory 32 stores programs and information including a table read from the disk drive 37.

The management IF 33 is an interface connected to the storage system 2 via the management network 5.

The pointing device 34 and the input device 35 transmit information input by an administrator to the CPU 31. For example, the pointing device 34 is a mouse and the input device 35 is a keyboard.

The output device 36 outputs information instructed by the CPU 31. The output device 36 is, for example, a liquid crystal display.

The disk drive 37 stores programs and various types of information including a table. For example, the disk drive 37 includes a user interface (UI) control program 301, a storage communication program 302, and a storage table 303.

The UI control program 301 controls the pointing device 34, the input device 35, and the output device 36. The storage communication program 302 communicates with the storage system 2. For example, the storage communication program 302 transmits various requests to the storage system 2.

The storage table 303 stores information on the storage system 2 connected to the management terminal 3. It should be noted that the storage table 303 will be described later in detail with reference to FIG. 14.

Figure 3:
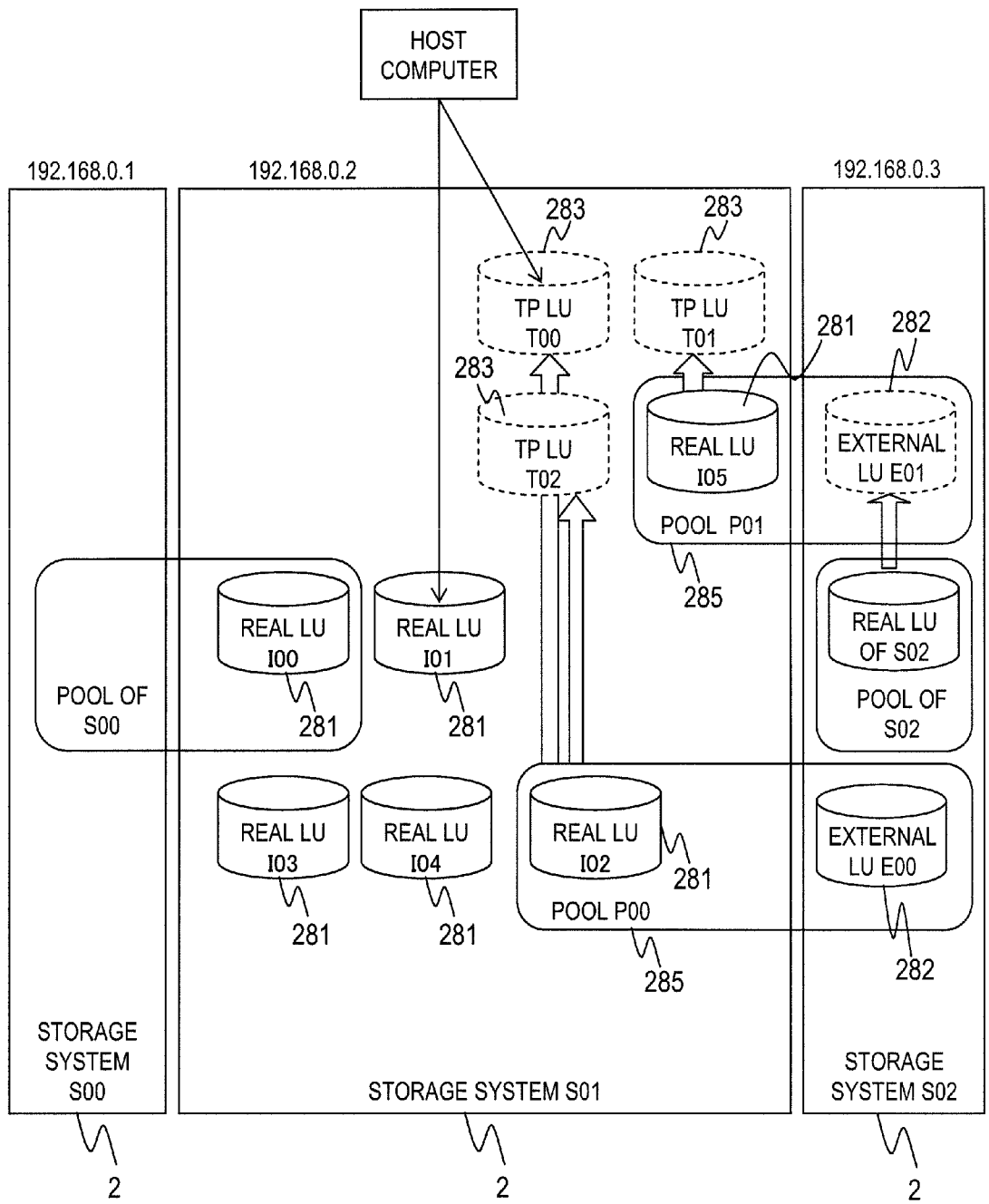
FIG. 3 is an explanatory diagram of volumes in accordance with the first embodiment of this invention.

FIG. 3 is an explanatory diagram of volumes according to the first embodiment of this invention.

Each of the storage systems 2 sets the storage areas of the disk drives 28 included therein as one or more real LUs 281. Then, the storage system 2 provides the set real LUs 281 to the host computer 1 or the external storage system 2.

In addition, the storage system 2 sets one or more TPLUs 283. Then, the storage system 2 provides the set TPLUs 283 to the host computer 1 or the external storage system 2.

It should be noted that the storage system 2 recognizes the LU provided by the external storage system 2 as an external LU 282. In other words, the storage system 2 recognizes both the real LU 281 and the TPLU 283 provided by the external storage system 2 as the external LU 282.

Further, the storage system 2 manages a storage pool 285 including at least one of the real LU 281 and the external LU 282. In other words, the storage pool 285 may include only the real LU 281, may include only the external LU 282, or may include both the real LU 281 and the external LU 282. Moreover, the external LU 282 included in the storage pool 285 may either be the real LU 281 or TPLU 283 of the storage system 2 that is providing the external LU 282.

Further, one TPLU 283 is associated with one storage pool 285. Further, upon reception of a write request to the TPLU 283, the storage system 2 assigns an unwritten storage area of the storage pool 285 corresponding to the TPLU 283 to the TPLU 283. It should be noted that the unwritten storage area of the storage pool 285 is a storage area that is not assigned to any TPLU 283 among all the storage areas included in the storage pool 285.

Accordingly, the storage system 2 can assign both the storage area of the real LU 281 and the storage area of the external LU 282 to one TPLU 283. In this case, a part of data requested for data write to the TPLU 283 is stored in the real LU 281 and the rest of the data requested for data write to the same TPLU 283 is stored in the external LU 282.

In the explanatory diagram shown in the figure, the storage system 2 identified by a storage ID "S01" sets the storage areas of the disk drives included therein as the real LU 281 identified by an LU ID "I00", the real LU 281 identified by an LU ID "I01", the real LU 281 identified by an LU ID "I02", the real LU 281 identified by an LU ID "I03", the real LU 281 identified by an LU ID "I04", and the real LU 281 identified by an LU ID "I05".

Further, the storage system 2 identified by the storage ID "S01" sets the TPLU 283 identified by an LU ID "T00", the TPLU 283 identified by an LU ID "T01", and the TPLU 283 identified by an LU ID "T02". Further, the storage system 2 identified by the storage ID "S01" provides the real LU 281 identified by an LU ID "I01" and the TPLU 283 identified by the LU ID "T00" to the host computer 1.

Further, the storage system 2 identified by the storage ID "S01" provides the real LU 281 identified by the LU ID "I00" to the storage system 2 identified by a storage ID "S00". Subsequently, the storage system 2 identified by the storage ID "S00" recognizes the real LU 281 provided by the storage system 2 identified by the storage ID "S01" as the external LU 282. Then, the storage system 2 identified by the storage ID "S00" sets the storage pool 285 including the external LU 282.

The storage system 2 identified by the storage ID "S01" recognizes the LUs provided by the storage system 2 identified by a storage ID "S02" as the external LU 282 identified by an LU ID "E00" and the external LU 282 identified by an LU ID "E01". It should be noted that in this embodiment, the LU includes both the TPLU and the real LU.

Specifically, the storage system 2 identified by the storage ID "S01" recognizes the real LU 281 provided by the storage system 2 identified by the storage ID "S02" as the external LU 282 identified by the LU ID "E00". On the other hand, the storage system 2 identified by the storage ID "S01" recognizes the TPLU 283 provided by the storage system 2 identified by the storage ID "S02" as the external LU 282 identified by the LU ID "E01".

Further, the storage system 2 identified by the storage ID "S01" sets the real LU 281 identified by the LU ID "I02" and the external LU 282 identified by the LU ID "E00" as the storage pool 285 identified by a pool ID "P00". In other words, the storage pool 285 identified by the pool ID "P00" includes the real LU 281 in the storage system 2 identified by the storage ID "S01" and the real LU 281 in the storage system 2 identified by the storage ID "S02".

Moreover, the storage system 2 identified by the storage ID "S01" sets the real LU 281 identified by the LU ID "I05" and the external LU 282 identified by the LU ID "E01" as the storage pool 285 identified by a pool ID "P01". In other words, the storage pool 285 identified by the pool ID "P01" includes the real LU 281 in the storage system 2 identified by the storage ID "S01" and the TPLU 283 in the storage system 2 identified by the storage ID "S02".

In addition, upon reception of a write request to the TPLU 283 identified by the LU ID "T00" or the TPLU 283 identified by the LU ID "T02", the storage system 2 identified by the storage ID "S01" assigns the unwritten storage area of the storage pool 285 identified by the pool ID "P00" to the corresponding TPLU 283. Similarly, upon reception of a write request to the TPLU 283 identified by the LU ID "T01", the storage system 2 identified by the storage ID "S01" assigns the unwritten storage area of the storage pool 285 identified by the pool ID "P01" to the corresponding TPLU 283.

FIG. 4 is a configuration diagram of the real LU table 206 stored in the storage system 2 according to the first embodiment of this invention.

The real LU table 206 includes a real LU ID 2061, a size 2062, an assigned device type 2063, and an assigned device ID 2064.

The real LU ID 2061 is a unique identifier of the real LU 281 of the storage system 2 storing the real LU table 206. The size 2062 is a storage capacity of the real LU 281 identified by the real LU ID 2061 of the record concerned.

The assigned device type 2063 indicates a type of a device to which the real LU 281 identified by the real LU ID 2061 of the record concerned is assigned.

Specifically, the assigned device type 2063 indicates an assignment of the real LU 281 for either of the external storage system 2, the host computer 1, or the storage pool 285.

The assigned device ID 2064 is a unique identifier of a device to which the real LU 281 identified by the real LU ID 2061 of the record concerned is assigned.

It should be noted that when the real LU 281 is assigned to the external storage system 2, the storage system 2 provides the real LU 281 to the external storage system 2. Thus, the assigned device ID 2064 becomes a unique identifier of the storage system 2 that is to be the provision destination of the real LU 281 identified by the real LU ID 2061 of the record concerned.

Further, when the real LU 281 is assigned to the host computer 1, the storage system 2 provides the real LU 281 to the host computer 1. Thus, the assigned device ID 2064 becomes a unique identifier of the host computer 1 that is to be the provision destination of the real LU 281 identified by the real LU ID 2061 of the record concerned.

Further, when the real LU 281 is assigned to the storage pool 285, the storage system 2 sets the storage pool 285 including the real LU 281. Thus, the assigned device ID 2064 becomes a unique identifier of the storage pool 285 including the real LU 281 identified by the real LU ID 2061 of the record concerned.

The assigned device type 2063 and the assigned device ID 2064 may indicate that the real LU 281 identified by the real LU ID 2061 of the record concerned is unassigned or reserved.

When the assigned device type 2063 and the assigned device ID 2064 indicate that the real LU 281 is unassigned, the real LU 281 identified by the real LU ID 2061 of the record concerned is in a status where the real LU 281 is not assigned to the host computer 1, the external storage system 2, or the storage pool 285 although capable of being assigned thereto.

On the other hand, when the assigned device type 2063 and the assigned device ID 2064 indicate that the real LU 281 is reserved, the real LU 281 identified by the real LU ID 2061 of the record concerned is in a status where the real LU 281 cannot be assigned to the external storage system 2 although capable of being assigned to the host computer 1 or the storage pool 285.

Next, a description will be given of creation processing of the real LU 281. The administrator inputs to the management terminal 3 information on the real LU 281 requested for creation. At this time, a real LU creation screen is displayed on the management terminal 3.

FIG. 5 is an explanatory diagram of a real LU creation screen 311 displayed on the management terminal 3 according to the first embodiment of this invention.

The real LU creation screen 311 includes a storage ID input field 3111, a real LU ID input field 3112, a size input field 3113, an assignment inhibition designation field 3114, an OK button 3115, and a cancel button 3116.

The storage ID input field 3111 is input with the unique identifier of the storage system 2 that is to be a creation destination of the real LU 281 requested for creation by the administrator.

The real LU ID input field 3112 is input with the unique identifier of the real LU 281 requested for creation by the administrator. The size input field 3113 is input with a storage capacity of the real LU 281 requested for creation by the administrator.

The assignment inhibition designation field 3114 is used by the administrator to designate whether the assignment of the real LU 281 requested for creation to the external storage system 2 is inhibited. In other words, the assignment inhibition designation field 3114 is used by the administrator to designate whether provision of the real LU 281 requested for creation to the external storage system 2 is inhibited.

When the cancel button 3116 is operated by the administrator, the management terminal 3 closes the real LU creation screen 311.

On the other hand, when the OK button 3115 is operated by the administrator, the management terminal 3 transmits a real LU creation request to the storage system 2 identified by the storage ID input to the storage ID input field 3111.

It should be noted that the real LU creation request includes the real LU ID input to the real LU ID input field 3112 and the size input to the size input field 3113. Further, the real LU creation request includes information indicating whether assignment inhibition has been designated in the assignment inhibition designation field 3114.

Upon reception of the real LU creation request, the storage system 2 creates a real LU 281. Specifically, the storage system 2 creates a real LU 281 having the size included in the received real LU creation request.

Further, the storage system 2 stores information on the created real LU 281 in the real LU table 206.

Specifically, the storage system 2 creates a new record in the real LU table 206. Next, the storage system 2 stores a real LU ID included in the received real LU creation request as the real LU ID 2061 of the new record. Then, the storage system 2 stores the size included in the received real LU creation request as the size 2062 of the new record.

Subsequently, the storage system 2 judges whether the assignment inhibition has been designated in the assignment inhibition designation field 3114 of the real LU creation screen 311 based on the information included in the received real LU creation request.

When the assignment inhibition is designated, the storage system 2 stores information indicating that the real LU 281 is reserved as the assigned device type 2063 and the assigned device ID 2064 of the new record. On the other hand, when the assignment inhibition is not designated, the storage system 2 stores information indicating that the real LU 281 is unassigned as the assigned device type 2063 and the assigned device ID 2064 of the new record.

As described above, the storage system 2 stores the information on the created real LU 281 in the real LU table 206.

FIG. 6 is a configuration diagram of the external storage table 207 stored in the storage system 2 according to the first embodiment of this invention.

The external storage table 207 includes a storage ID 2071 and an address 2072.

The storage ID 2071 is a unique identifier of the storage system (external storage system) 2 connected to the storage system 2 that is storing the external storage table 207. The address 2072 is an address used for accessing the external storage system 2 identified by the storage ID 2071 of the record concerned. For example, the address 2072 is an IP address assigned to the external storage system 2 identified by the storage ID 2071 of the record concerned. It should be noted that the address 2072 may be other addresses such as world wide name (WWN).

FIG. 7 is a configuration diagram of the external LU table 208 stored in the storage system 2 according to the first embodiment of this invention.

The external LU table 208 includes an external LU ID 2081, an external LU type 2082, a size 2083, a storage ID 2084, an assigned device type 2085, and an assigned device ID 2086.

The external LU ID 2081 is a unique identifier of the external LU 282 provided by the external storage system 2. In other words, the external LU ID 2081 is a unique identifier of the external LU 282 of the storage system 2 that is storing the external LU table 208. The storage ID 2084 is a unique identifier of the external storage system 2 as a provider of the external LU 282 identified by the external LU ID 2081 of the record concerned.

The external LU type 2082 indicates which of the real LU 281 and the TPLU 283 the external LU 282 identified by the external LU ID 2081 of the record concerned is, in the external storage system 2 identified by the storage ID 2084 of the record concerned.

The size 2083 is a storage capacity of the external LU 282 identified by the external LU ID 2081 of the record concerned. It should be noted that when the external LU 282 is the TPLU 283 in the external storage system 2, the size 2083 becomes a virtual storage capacity of the TPLU 283. The virtual storage capacity of the TPLU 283 is not a storage capacity actually assigned to the TPLU 283 from the storage pool 285 but is a storage capacity recognized by the host computer 1 or the storage system 2 to be the provision destination of the TPLU 283.

The assigned device type 2085 indicates a type of the device to which the external LU 282 identified by the external LU ID 2081 of the record concerned is assigned.

Specifically, the assigned device type 2085 indicates which of the host computer 1 and the storage pool 285 the external LU 282 is assigned to.

The assigned device ID 2086 is a unique identifier of the device to which the external LU 282 identified by the external LU ID 2081 of the record concerned is assigned.

It should be noted that when the external LU 282 is assigned to the host computer 1, the storage system 2 provides the external LU 282 to the host computer 1. Thus, the assigned device ID 2086 becomes a unique identifier of the host computer 1 that is to be the provision destination of the external LU 282 identified by the external LU ID 2081 of the record concerned.

Further, when the external LU 282 is assigned to the storage pool 285, the storage 2 sets the storage pool 285 including the external LU 282. Thus, the assigned device ID 2086 becomes a unique identifier of the storage pool 285 including the external LU 282 identified by the external LU ID 2081 of the record concerned.

FIG. 8 is a configuration diagram of the pool table 209 stored in the storage system 2 according to the first embodiment of this invention.

The pool table 209 includes a pool ID 2091, an external LU type 2092, an external LU size 2093, and an assignment threshold 2094.

The pool ID 2091 is a unique identifier of the storage pool 285 set by the storage system 2 that is storing the pool table 209.

The external LU type 2092 indicates which of the real LU 281 and the TPLU 283 the external LU 282 that can be added to the storage pool 285 identified by the pool ID 2091 of the record concerned is, in the external storage system 2.

The external LU size 2093 indicates a minimum value of the storage capacity of the external LU 282 that can be added to the storage pool 285 identified by the pool ID 2091 of the record concerned.

The assignment threshold 2094 is a threshold for judging whether the unwritten storage area of the storage pool 285 identified by the pool ID 2091 of the record concerned is short. When the capacity of the unwritten storage area of the storage pool 285 becomes smaller than the assignment threshold 2094, the storage system 2 judges that the unwritten storage area of the storage pool 285 is short. When it is judged that the unwritten storage area of the storage pool 285 is short, the storage system 2 executes processing for adding a storage capacity to the storage pool 285.

Next, a description will be given of creation processing of the storage pool 285. The administrator inputs information on the storage pool 285 requested for creation to the management terminal 3. At this time, a pool creation screen is displayed on the management terminal 3.

FIG. 9 is an explanatory diagram of a pool creation screen 312 displayed on the management terminal 3 according to the first embodiment of this invention.

The pool creation screen 312 includes a storage ID input field 3121, a pool ID input field 3122, an external LU assignment policy input area, an OK button 3126, and a cancel button 3127.

The storage ID input field 3121 is input with a unique identifier of the storage system 2 that is to be the creation destination of the storage pool 285 requested for creation by the administrator. The pool ID input field 3122 is input with a unique identifier of the storage pool 285 requested for creation by the administrator.

The external LU assignment policy input area includes an external LU type selection field 3123, an external LU size input field 3124, and an assignment threshold input field 3125.

The external LU type selection field 3123 is used by the administrator to select which of the real LU 281 and the TPLU 283 the external LU 282 that can be added to the storage pool 285 requested for creation is, in the external storage system 2.

The external LU size input field 3124 is input with a minimum value of the storage capacity of the external LU 282 that can be added to the storage pool 285 requested for creation by the administrator. The assignment threshold input field 3125 is input with a threshold for judging whether the capacity of the storage pool 285 requested for creation is short by the administrator.

When the cancel button 3127 is operated, the management terminal 3 closes the pool creation screen 312.

On the other hand, when the OK button 3126 is operated, the management terminal 3 transmits a pool creation request to the storage system 2 identified by the storage ID input to the storage ID input field 3121.

It should be noted that the pool creation request includes a pool ID input to the pool ID input field 3122, an external LU size input to the external LU size input field 3124, and an assignment threshold input to the assignment threshold input field 3125. Further, the pool creation request includes information that indicates which of the real LU 281 and the TPLU 283 has been selected in the external LU type selection field 3123.

Upon reception of the pool creation request, the storage system 2 updates the pool table 209.

Specifically, the storage system 2 creates a new record in the pool table 209. Next, the storage system 2 stores the pool ID included in the received pool creation request as the pool ID 2091 of the new record. Subsequently, the storage system 2 judges which of the real LU 281 and the TPLU 283 has been selected in the external LU type selection field 3123 of the pool creation screen 312 based on the information included in the received pool creation request.

When it is judged that the real LU 281 has been selected in the external LU type selection field 3123, the storage system 2 stores information indicating the real LU 281 as the external LU type 2092 of the new record. On the other hand, when it is judged that the TPLU 283 has been selected in the external LU type selection field 3123, the storage system 2 stores information indicating the TPLU 283 as the external LU type 2092 of the new record.

Subsequently, the storage system 2 stores the size included in the received pool creation request as the external LU size 2093 of the new record. Then, the storage system 2 stores the assignment threshold included in the received pool creation request as the assignment threshold 2094 of the new record.

As described above, the storage system 2 updates the pool table 209.

FIG. 10 is a configuration diagram of the TPLU table 210 stored in the storage system 2 according to the first embodiment of this invention.

The TPLU table 210 includes a TPLU ID 2101, a size 2102, a pool ID 2103, an assigned device type 2104, and an assigned device ID 2105.

The TPLU ID 2101 is a unique identifier of the TPLU 283 of the storage system 2 that is storing the TPLU table 210.

The size 2102 is a virtual storage capacity of the TPLU 283 identified by the TPLU ID 2101 of the record concerned. In other words, the size 2102 is not a storage capacity actually assigned to the TPLU 283 from the storage pool 285 but is a storage capacity recognized by the host computer 1 or the external storage system 2 to be the provision destination of the TPLU 283.

The pool ID 2103 is a unique identifier of the storage pool 285 including the storage area assigned to the TPLU 283 identified by the TPLU ID 2101 of the record concerned.

The assigned device type 2104 indicates a type of the device to which the TPLU 283 identified by the TPLU ID 2101 of the record concerned is assigned.

Specifically, the assigned device type 2104 indicates which of the external storage system 2 and the host computer 1 the TPLU 283 is assigned to.

The assigned device ID 2105 is a unique identifier of the device to which the TPLU 283 identified by the TPLU ID 2101 of the record concerned is assigned to.

It should be noted that when the TPLU 283 is assigned to the external storage system 2, the storage system 2 provides the TPLU 283 to the external storage system 2. Thus, the assigned device ID 2105 becomes a unique identifier of the storage system 2 that is to be the provision destination of the TPLU 283 identified by the TPLU ID 2101 of the record concerned.

Further, when the TPLU 283 is assigned to the host computer 1, the storage system 2 provides the TPLU 283 to the host computer 1. Thus, the assigned device ID 2105 becomes a unique identifier of the host computer 1 that is to be the provision destination of the TPLU 283 identified by the TPLU ID 2101 of the record concerned.

The assigned device type 2104 and the assigned device ID 2105 may indicate that the TPLU 283 identified by the TPLU ID 2101 of the record concerned is unassigned or reserved.

When the assigned device type 2104 and the assigned device ID 2105 indicate that the TPLU 283 is unassigned, the TPLU 283 identified by the TPLU ID 2101 of the record concerned is in a status where the TPLU 283 is assigned to neither the host computer 1 nor the external storage system 2 although capable of being assigned thereto.

On the other hand, when the assigned device type 2104 and the assigned device ID 2105 indicate that the TPLU 283 is reserved, the TPLU 283 identified by the TPLU ID 2101 of the record concerned is in a status where the TPLU 283 cannot be assigned to the external storage system 2 although capable of being assigned to the host computer 1. Next, a description will be given of creation processing of the TPLU 283.

The administrator inputs to the management terminal 3 information on the TPLU 283 requested for creation. At this time, a TPLU creation screen is displayed on the management terminal 3.

FIG. 11 is an explanatory diagram of a TPLU creation screen 313 displayed on the management terminal 3 according to the first embodiment of this invention.

The TPLU creation screen 313 includes a storage ID input field 3131, a pool ID input field 3132, a TPLU ID input field 3133, a size input field 3134, an assignment inhibition designation field 3135, an OK button 3136, and a cancel button 3137.

The storage ID input field 3131 is input with the unique identifier of the storage system 2 that is to be a creation destination of the TPLU 283 requested for creation by the administrator. The pool ID input field 3132 is input with the unique identifier of the storage pool 285 including a storage area that can be assigned to the TPLU 283 requested for creation by the administrator.

The TPLU ID input field 3133 is input with the unique identifier of the TPLU 283 requested for creation by the administrator. The size input field 3134 is input with a virtual storage capacity of the TPLU 283 requested for creation by the administrator.

The assignment inhibition designation field 3135 is used by the administrator to designate whether the assignment of the TPLU 283 requested for creation to the external storage system 2 is inhibited. In other words, the assignment inhibition designation field 3135 is used by the administrator to designate whether provision of the TPLU 283 requested for creation to the external storage system 2 as the external LU 282 is inhibited.

When the cancel button 3137 is operated by the administrator, the management terminal 3 closes the TPLU creation screen 313.

On the other hand, when the OK button 3136 is operated by the administrator, the management terminal 3 transmits a TPLU creation request to the storage system 2 identified by the storage ID input to the storage ID input field 3131.

It should be noted that the TPLU creation request includes the pool ID input to the pool ID input field 3132, the TPLU ID input to the TPLU ID input field 3133, and the size input to the size input field 3134. Further, the TPLU creation request includes information indicating whether assignment inhibition has been designated in the assignment inhibition designation field 3135.

Upon reception of the TPLU creation request, the storage system 2 updates the TPLU table 210.

Specifically, the storage system 2 creates a new record in the TPLU table 210. Next, the storage system 2 stores a TPLU ID included in the received TPLU creation request as the TPLU ID 2101 of the new record. Then, the storage system 2 stores the size included in the received TPLU creation request as the size 2102 of the new record. After that, the storage system 2 stores the pool ID included in the received TPLU creation request as the pool ID 2103 of the new record.

Subsequently, the storage system 2 judges whether the assignment inhibition has been designated in the assignment inhibition designation field 3135 of the TPLU creation screen 313 based on the information included in the received TPLU creation request.

When the assignment inhibition is designated, the storage system 2 stores information indicating that the TPLU 283 is reserved as the assigned device type 2104 and the assigned device ID 2105 of the new record. On the other hand, when the assignment inhibition is not designated, the storage system 2 stores information indicating that the TPLU 283 is unassigned as the assigned device type 2104 and the assigned device ID 2105 of the new record.

As described above, the storage system 2 updates the TPLU table 210.

FIG. 12 is a configuration diagram of the mapping table 211 stored in the storage system 2 according to the first embodiment of this invention.

The mapping table 211 includes a TPLU ID 2111, a TP page number 2112, an LU type 2113, a storage ID 2114, an LU ID 2115, and a real page number 2116.

The TPLU ID 2111 is a unique identifier of the TPLU 283 of the storage system 2 that is storing the mapping table 211. The TP page number 2112 is a unique identifier of a page (TP page) included in the TPLU 283 identified by the TPLU ID 2111 of the record concerned.

The LU type 2113 indicates which of the real LU 281 and the external LU 282 contains a real page assigned to the TP page identified by the TPLU ID 2111 and the TP page number 2112 of the record concerned. In other words, the LU type 2113 indicates which of the real LU 281 and the external LU 282 actually stores data requested for data write to the TP page identified by the TPLU ID 2111 and the TP page number 2112 of the record concerned.

Further, the LU type 2113 may indicate that the TP page identified by the TPLU ID 2111 and the TP page number 2112 of the record concerned is not accessed. In this case, because the data requested for data write to the TP page does not exist, a real page is not assigned to the TP page. Thus, no value is stored as the storage ID 2114, the LU ID 2115, and the real page number 2116.

The storage ID 2114 is a unique identifier of the external storage system 2 including the real page assigned to the TP page identified by the TPLU ID 2111 and the TP page number 2112 of the record concerned. In other words, the storage ID 2114 is a unique identifier of the external storage system 2 that is actually storing the data requested for data write to the TP page identified by the TPLU ID 2111 and the TP page number 2112 of the record concerned. It should be noted that when the data requested for data write to the TP page is actually stored in the real LU 281, no value is stored as the storage ID 2114.

The LU ID 2115 is a unique identifier of the real LU 281 or the external LU 282 including the real page assigned to the TP page identified by the TPLU ID 2111 and the TP page number 2112 of the record concerned. In other words, the LU ID 2115 is a unique identifier of the real LU 281 or the external LU 282 that is actually storing the data requested for data write to the TP page identified by the TPLU ID 2111 and the TP page number 2112 of the record concerned.

The real page number 2116 is a unique identifier of the real page assigned to the TP page identified by the TPLU ID 2111 and the TP page number 2112 of the record concerned. In other words, the real page number 2116 is a unique identifier of the real page that is actually storing the data requested for data write to the TP page identified by the TPLU ID 2111 and the TP page number 2112 of the record concerned. It should be noted that the real page is a page included in the real LU 281 or the external LU 282 identified by the LU ID 2115 of the record concerned.

When an administrator or the like operates the management terminal 3 for adding a real LU 281 to a storage pool 285, the CPU 24 of the storage system 2 executes the following processing according to the TP program 202. The storage system 2 adds to the page table 212 new records that correspond to all of real pages of the real LU 281 added to the storage pool 285.

FIG. 13 is a configuration diagram of the page table 212 stored in the storage system 2 according to the first embodiment of this invention.

The page table 212 includes an LU type 2121, a storage ID 2122, an LU ID 2123, a real page number 2124, and a status 2125.

The LU ID 2123 is a unique identifier of the real LU 281 or the external LU 282 of the storage system 2 that is storing the page table 212. The LU type 2121 indicates which of the real LU 281 and the external LU 282 the LU identified by the LU ID 2123 of the record concerned is.

The storage ID 2122 is a unique identifier of the external storage system 2 that provides the external LU 282 identified by the LU ID 2123 of the record concerned. Thus, when the LU identified by the LU ID 2123 of the record concerned is the real LU 281, no value is stored as the storage ID 2122.

The real page number 2124 is a unique identifier of a page (real page) included in the real LU 281 or the external LU 282 identified by the LU ID 2123 of the record concerned.

The status 2125 indicates whether data is already written in the real page identified by the real page number 2124 of the record concerned.

FIG. 14 is a configuration diagram of the storage table 303 stored in the management terminal 3 according to the first embodiment of this invention.

The storage table 303 includes a storage ID 3031 and an address 3032.

The storage ID 3031 is a unique identifier of the storage system 2 connected to the management terminal 3. The address 3032 is an address used for accessing the storage system 2 identified by the storage ID 3031 of the record concerned. For example, the address 3032 is an IP address assigned to the storage system 2 identified by the storage ID 3031 of the record concerned.

Next, processing of the computer system according to the first embodiment of this invention will be described.

Figure 15:
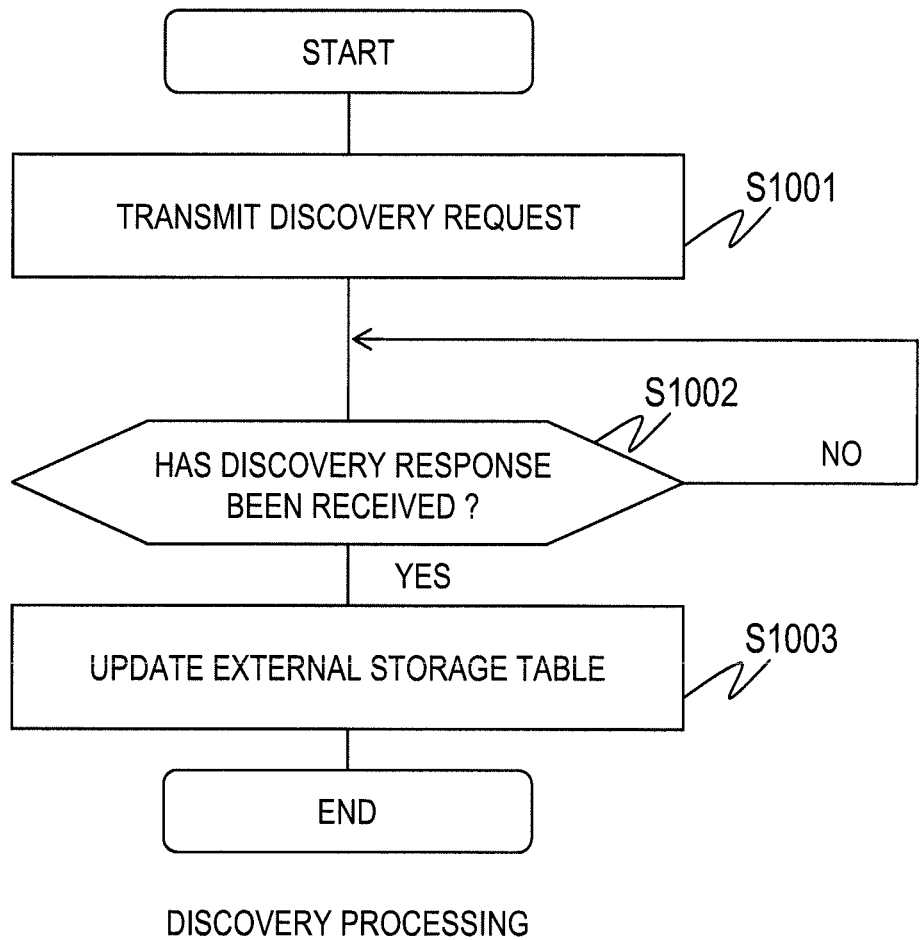
FIG. 15 is a flowchart of discovery processing executed by the storage system in accordance with the first embodiment of this invention.

FIG. 15 is a flowchart of discovery processing executed by the storage system 2 according to the first embodiment of this invention.

The CPU 24 of the storage system 2 executes the discovery processing by executing the external storage control program 203.

It should be noted that the storage system 2 may execute the discovery processing at an arbitrary timing. For example, the storage system 2 may execute the discovery processing periodically, may execute the discovery processing before executing external LU creation processing to be described later, or may execute the discovery processing according to an instruction from the management terminal 3.

First, the storage system 2 transmits a discovery request by broadcast or multicast (S1001). Accordingly, the storage system 2 transmits the discovery request to the storage system 2 (external storage systems 2) other than that of a transmission source of the discovery request among all the storage systems 2 included in the computer system.

Upon reception of the discovery request, the external storage system 2 transmits a discovery response including a storage ID and an IP address assigned to the external storage system 2 to the storage system 2 as the transmission source of the discovery request.

On the other hand, upon transmission of the discovery request, the storage system 2 judges whether the discovery response has been received (S1002). When the discovery response is not received, the storage system 2 waits until the discovery response is received.

Upon reception of the discovery response, the storage system 2 judges whether the external storage table 207 includes a record whose storage ID 2071 of the external storage table 207 matches the storage ID contained in the received discovery response.

When the record exists, the external storage system 2 is not newly added to the computer system. Thus, the storage system 2 ends the discovery processing without updating the external storage table 207.

On the other hand, when the record does not exist, the external storage system 2 is newly added to the computer system. Thus, the storage system 2 updates the external storage table 207 (S1003).

Specifically, the storage system 2 creates a new record in the external storage table 207. Next, the storage system 2 stores the storage ID contained in the received discovery response as the storage ID 2071 of the new record. Then, the storage system 2 stores the IP address contained in the received discovery response as the address 2072 of the new record.

As described above, the storage system 2 updates the external storage table 207. After that, the storage system 2 ends the discovery processing.

Figure 16:
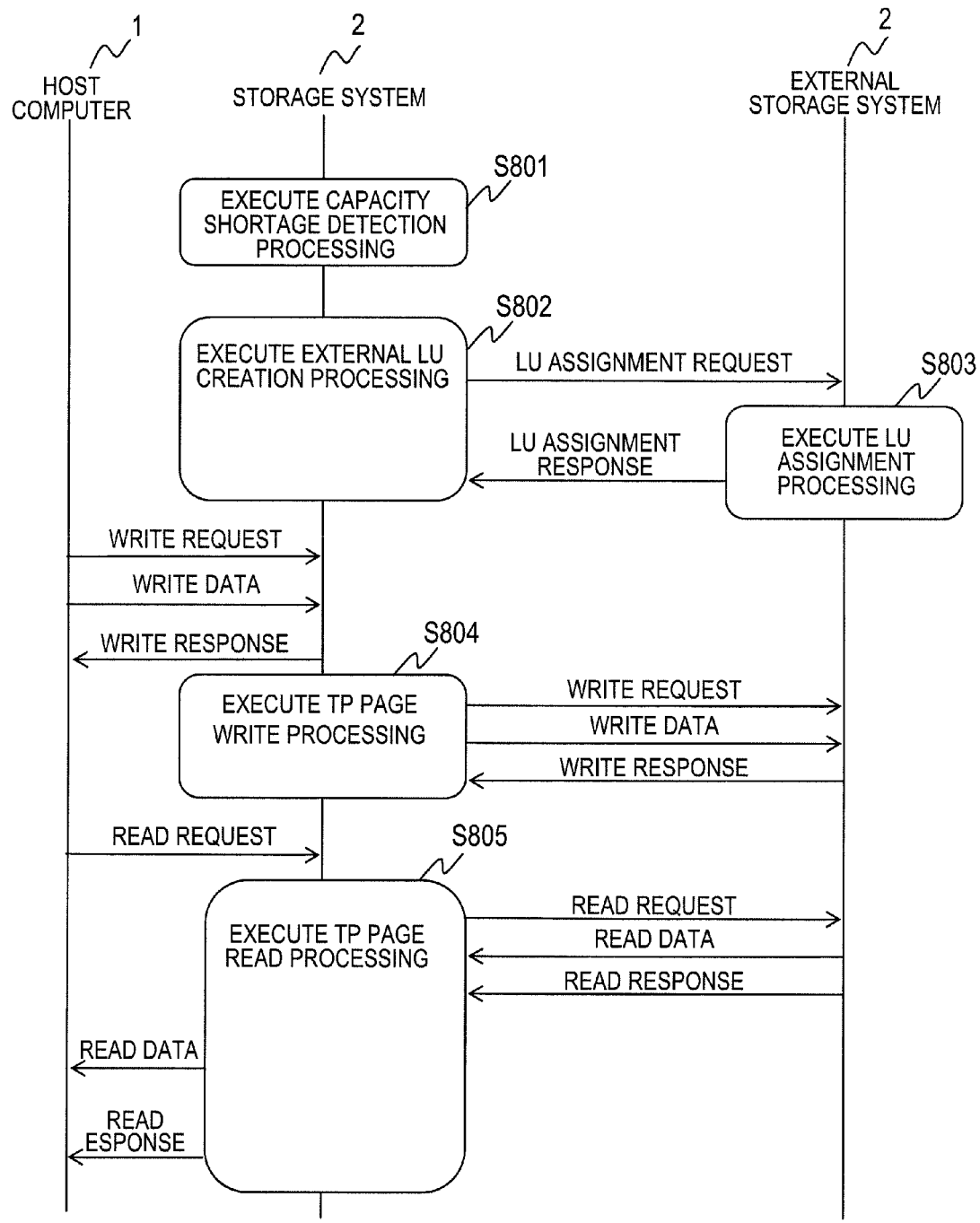
FIG. 16 is a sequence diagram schematically showing processing executed by the computer system in accordance with the first embodiment of this invention.

FIG. 16 is a sequence diagram schematically showing processing executed by the computer system according to the first embodiment of this invention.

The storage system 2 periodically executes capacity shortage detection processing (S801). It should be noted that the capacity shortage detection processing will be described later in detail with reference to FIG. 17.

In the capacity shortage detection processing, the storage system 2 judges whether the unwritten storage area of the storage pool 285 is short.

When it is judged that the unwritten storage area of the storage pool 285 is sufficient, the storage system 2 does not execute the external LU creation processing. On the other hand, when it is judged that the unwritten storage area of the storage pool 285 is short, the storage system 2 executes the external LU creation processing (S802). It should be noted that the external LU creation processing will be described later in detail with reference to FIG. 18.

In the external LU creation processing, the storage system 2 transmits an LU assignment request to the external storage system 2. Upon reception of the LU assignment request, the external storage system 2 executes LU assignment processing (S803). It should be noted that the LU assignment processing will be described later in detail with reference to FIG. 19A and FIG. 19B.

In the LU assignment processing, the external storage system 2 transmits an LU assignment response to the storage system 2. Upon reception of the LU assignment response from the external storage system 2, the storage system 2 updates the external LU table 208. Accordingly, the storage system 2 eliminates the shortage of the unwritten storage area of the storage pool 285.

After that, upon reception of a write request and write data from the host computer 1, the storage system 2 stores the received write data in the cache memory 26 of the storage system 2. Then, the storage system 2 transmits a write response for notifying processing completion of the received write request to the host computer 1.

Next, the storage system 2 judges which of the real LU 281, the external LU 282, and the TPLU 283 is a write target with respect to the received write request.

When the write target is the real LU 281, the storage system 2 writes the write data stored in the cache memory 26 in the real LU 281 as the write target.

On the other hand, when the write target is the external LU 282, the storage system 2 transmits the write request to the external storage system 2 including the external LU 282 as the write target. In addition, the storage system 2 transmits the write data stored in the cache memory 26 to the external storage system 2. Upon reception of the write request and the write data, the external storage system 2 writes the received write data in the external LU 282 as the write target (real LU 281 or TPLU 283 for the external storage system 2). Then, the external storage system 2 transmits a write response to the storage system 2.

On the other hand, when the write target is the TPLU 283, the storage system 2 executes TP page write processing (S804). It should be noted that the TP page write processing will be described later in detail with reference to FIG. 20A and FIG. 20B.

In the TP page write processing, the storage system 2 judges whether a real page assigned to the TP page to be a data write target is included in the external LU 282. When the real page assigned to the TP page is included in the external LU 282, the storage system 2 transmits the write request to the external storage system 2 including the external LU 282. In addition, the storage system 2 transmits the write data stored in the cache memory 26 to the external storage system 2. Upon reception of the write request and the write data, the external storage system 2 writes the received write data in the external LU 282 as the write target (real LU 281 or TPLU 283 for the external storage system 2). Then, the external storage system 2 transmits a write response to the storage system 2.

Next, assuming that a read request has been received from the host computer 1, the storage system 2 executes cache hit judgment. Specifically, the storage system 2 judges whether data requested for data read by the received read request is stored in the cache memory 26 of the storage system 2.

When the data is stored in the cache memory 26, the storage system 2 reads the data requested for data read by the received read request from the cache memory 26. Then, the storage system 2 transmits the read data and a read response to the host computer 1.

On the other hand, when the data is not stored in the cache memory 26, the storage system 2 judges which of the real LU 281, the external LU 282, and the TPLU 283 is a read target of the received read request.

When the read target is the real LU 281, the storage system 2 reads the data from the real LU 281 as the read target. Then, the storage system 2 transmits the read data and the read response to the host computer 1.

At this time, the storage system 2 judges whether a transmission source of the received read request is the host computer 1. In other words, the storage system 2 judges whether the real LU 281 as the read target is assigned to the host computer 1.

When the transmission source of the read request is the host computer 1, the storage system 2 stores the read data in the cache memory 26 of the storage system 2. Thus, the storage system 2 can enhance a rate by which data requested for data read from the host computer 1 is stored in the cache memory 26 (cache hit rate).

On the other hand, when the transmission source of the read request is the external storage system 2, the storage system 2 does not store the read data in the cache memory 26 of the storage system 2. Thus, storing of the same data in a plurality of cache memories 26 is prevented. Accordingly, the cache memory 26 of the storage system 2 can be used effectively.

On the other hand, when the read target is the external LU 282, the storage system 2 transmits the read request to the external storage system 2 including the external LU 282 as the read target. Upon reception of the read request, the external storage system 2 reads the data requested for data read by the received read request from the external LU 282. Then, the external storage system 2 transmits the read data and the read response to the storage system 2.

At this time, the external storage system 2 judges that the transmission source of the read request is the storage system 2. Thus, the external storage system 2 does not store the read data in the cache memory 26 of the external storage system 2.

Upon reception of the read data and the read request from the external storage system 2, the storage system 2 transmits the received read data to the host computer 1. In addition, the storage system 2 transmits the read response to the host computer 1.

At this time, the storage system 2 judges that the transmission source of the read request is the host computer 1. Thus, the storage system 2 stores the received read data in the cache memory 26 of the storage system 2.

On the other hand, when the read target is the TPLU 283, the storage system 2 executes TP page read processing (S805). It should be noted that the TP page read processing will be described later in detail with reference to FIG. 21.

In the TP page read processing, the storage system 2 judges whether a real page assigned to the TP page to be the data read target is included in the external LU 282. When the real page assigned to the TP page is included in the external LU 282, the storage system 2 transmits the read request to the external storage system 2 including the external LU 282. Upon reception of the read request, the external storage system 2 reads the data requested for data read by the received read request from the external LU 282 (real LU 281 or TPLU 283 for the external storage system 2). Then, the external storage system 2 transmits the read data and the read response to the storage system 2.

At this time, the external storage system 2 judges that the transmission source of the read request is the storage system 2. Thus, the external storage system 2 does not store the read data in the cache memory 26 of the external storage system 2.

Upon reception of the read data and the read response from the external storage system 2, the storage system 2 transmits the received read data to the host computer 1. In addition, the storage system 2 transmits the read response to the host computer 1.

At this time, the storage system 2 judges that the transmission source of the read request is the host computer 1. Thus, the storage system 2 stores the received read data in the cache memory 26 of the storage system 2.

Figure 17:
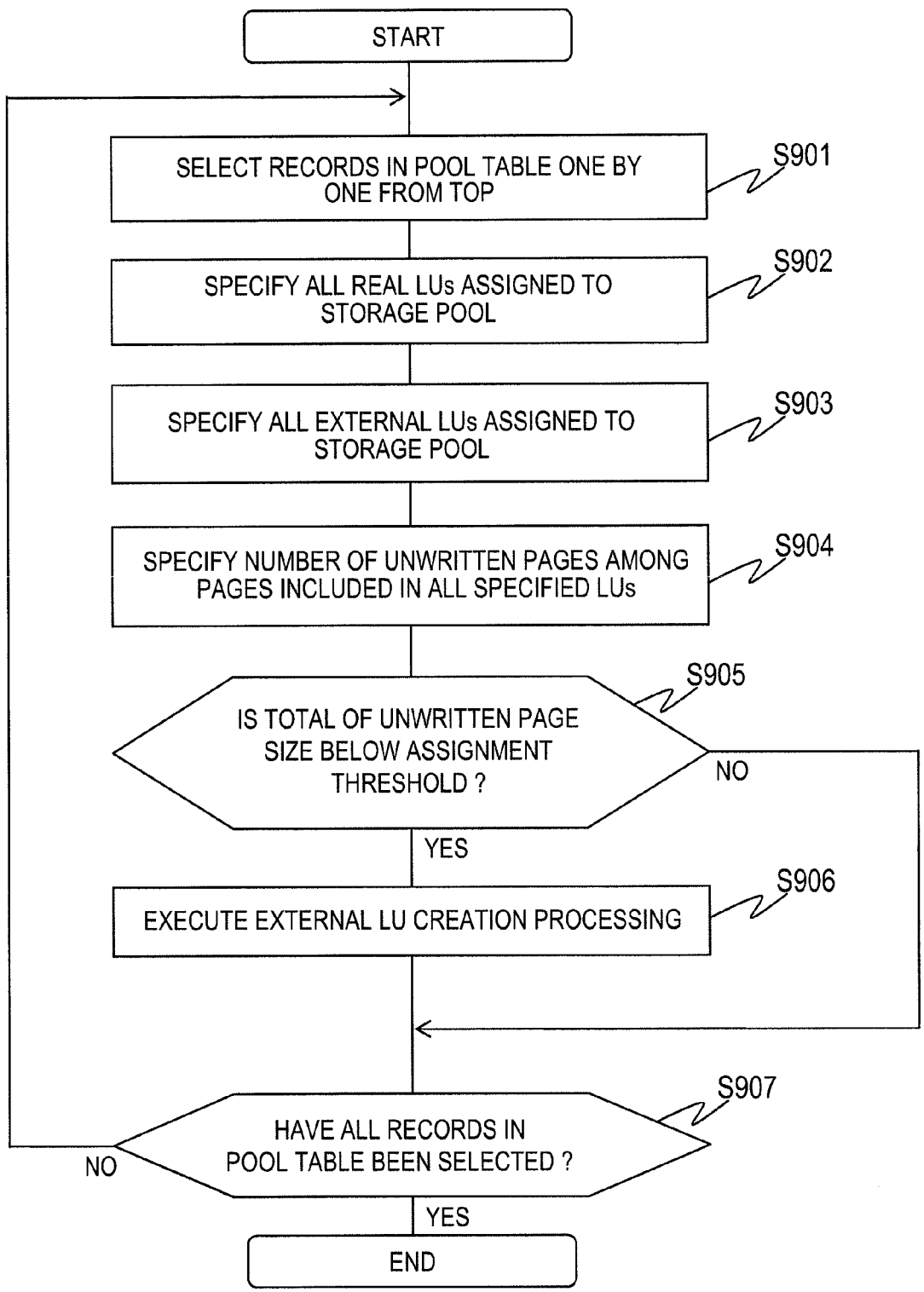
FIG. 17 is a flowchart of the capacity shortage detection processing executed by the storage system in accordance with the first embodiment of this invention.

FIG. 17 is a flowchart of the capacity shortage detection processing executed by the storage system 2 according to the first embodiment of this invention.

The CPU 24 of the storage system 2 executes the TP program 202 to thereby execute the capacity shortage detection processing at predetermined intervals.

First, the storage system 2 selects all the records included in the pool table 209 one by one from the top (S901).

Next, the storage system 2 executes processes from Step S902 to S907 for each selected record.

Then, the storage system 2 extracts the pool ID 2091 and the assignment threshold 2094 from the selected record.

Subsequently, the storage system 2 selects from the real LU table 206 all the records whose assigned device ID 2064 of the real LU table 206 matches the extracted pool ID 2091. Then, the storage system 2 extracts the real LU ID 2061 from all the selected records.

The storage system 2 specifies the real LUs 281 identified by the extracted real LU IDs 2061 as LUs assigned to the storage pool 285 identified by the extracted pool ID 2091 (S902).

Next, the storage system 2 selects from the external LU table 208 all the records whose assigned device ID 2086 of the external LU table 208 matches the extracted pool ID 2091. Then, the storage system 2 extracts the external LU ID 2081 and the storage ID 2084 from all the selected records.

The storage system 2 specifies the external LUs 282 identified by the extracted external LU IDs 2081, which are respectively included in the external storage system identified by the extracted storage IDs 2084, as LUs assigned to the storage pool 285 identified by the extracted pool ID 2091 (S903).

Next, the storage system 2 selects from the page table 212 all the records whose storage ID 2122 of the page table 212 is not stored with a value. Then, the storage system 2 selects from the selected records all the records whose LU ID 2123 of the page table 212 matches the extracted real LU ID 2061. After that, the storage system 2 selects from the selected records all the records whose status 2125 of the page table 212 indicates an unwritten status. Then, the storage system 2 counts the number of selected records.

The storage system 2 specifies the counted number of records as the number of unwritten pages among the pages contained in the real LUs 281 specified as the LUs assigned to the storage pool 285.

Subsequently, the storage system 2 selects from the page table 212 all the records whose storage ID 2122 of the page table 212 matches the extracted storage IDs 2084. Then, the storage system 2 selects from the selected records all the records whose LU ID 2123 of the page table 212 matches the extracted external LU IDs 2081. After that, the storage system 2 selects from the selected records all the records whose status 2125 of the page table 212 indicates the unwritten status. Then, the storage system 2 counts the number of selected records.

The storage system 2 specifies the counted number of records as the number of unwritten pages among the pages included in the external LUs 282 specified as the LUs assigned to the storage pool 285.

Subsequently, the storage system 2 calculates a sum of the counted number of records. The storage system 2 specifies the summing result as the number of unwritten pages among the pages included in all the LUs assigned to the storage pool 285 (S904).

Next, the storage system 2 multiplies a single page size by the summing result. Accordingly, the storage system 2 calculates a total size of the unwritten pages included in the storage pool 285. Then, the storage system 2 compares the calculated total size with the assignment threshold 2094 extracted in Step S902 (S905).

When the total size is equal to or larger than the assignment threshold 2094, the storage system 2 judges that the unwritten storage area of the storage pool 285 is sufficient. Thus, the storage system 2 advances to Step S907 without any further process.

On the other hand, when the total size is smaller than the assignment threshold 2094, the storage system 2 judges that the unwritten storage area of the storage pool 285 is short. In this case, the storage system 2 executes the external LU creation processing (S906). It should be noted that the external LU creation processing will be described later in detail with reference to FIG. 18.

Next, the storage system 2 judges whether all the records included in the pool table 209 have been selected in Step S901 (S907). When even one of the records included in the pool table 209 is not selected, the storage system 2 returns to Step S901. Then, the storage system 2 selects the unselected record from the pool table 209 and repeats the processing.

On the other hand, when all the records included in the pool table 209 are selected, the storage system 2 ends the capacity shortage detection processing.

Figure 18:
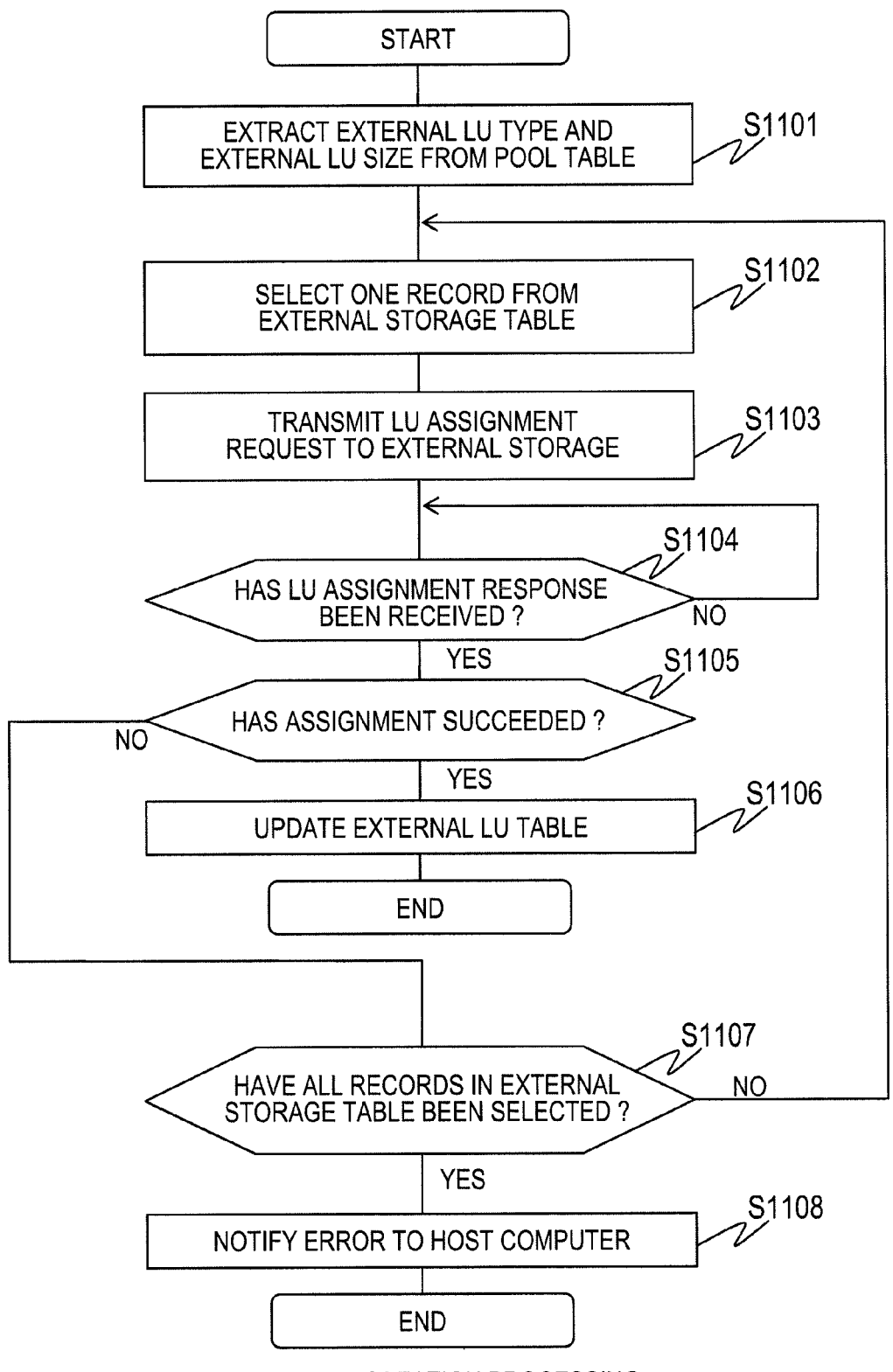
FIG. 18 is a flowchart of the external LU creation processing executed by the storage system in accordance with the first embodiment of this invention.

FIG. 18 is a flowchart of the external LU creation processing executed by the storage system 2 according to the first embodiment of this invention.

The CPU 24 of the storage system 2 executes the external storage control program 203 to thereby execute the external LU creation processing. It should be noted that when it is judged that the unwritten storage area of the storage pool 285 is short in Step S905 of the capacity shortage detection processing shown in FIG. 17, the storage system 2 executes the external LU creation processing.

First, the storage system 2 selects from the pool table 209 records regarding the storage pool 285 in which the unwritten storage area is short. It should be noted that the records regarding the storage pool 285 in which the unwritten storage area is short are records selected in Step S901 of the capacity shortage detection processing shown in FIG. 17.

Next, the storage system 2 extracts from the selected records the pool ID 2091, the external LU type 2092, and the external LU size 2093 (S1101).

Then, the storage system 2 selects from the external storage table 207 one of the records that has not been selected in the last Step 1102 (S1102). After that, the storage system 2 extracts the storage ID 2071 and the address 2072 from the selected record.

Subsequently, the storage system 2 transmits an LU assignment request containing the extracted external LU type 2092 and external LU size 2093 to the address stored as the extracted address 2072. Accordingly, the storage system 2 transmits the LU assignment request to the external storage system 2 identified by the extracted storage ID 2071 (S1103).

Upon reception of the LU assignment request, the external storage system 2 executes the LU assignment processing. It should be noted that the LU assignment processing will be described later in detail with reference to FIG. 19A and FIG. 19B.

In the LU assignment processing, the external storage system 2 transmits an LU assignment response to the storage system 2, which is the transmission source of the LU assignment request. It should be noted that the LU assignment response indicates whether the assignment of the LU to the storage system 2, which is the transmission source of the LU assignment request, has succeeded or not. Further, in a case where the LU assignment response indicates that the LU assignment has succeeded, the LU assignment response contains an identifier of the assigned LU (LU ID) and a size thereof.

On the other hand, upon transmission of the LU assignment request, the storage system 2 judges whether the LU assignment response has been received (S1104). When the LU assignment response is not received, the storage system 2 waits until the LU assignment response is received.

Then, upon reception of the LU assignment response, the storage system 2 judges whether the received LU assignment response indicates that the LU assignment has succeeded (S1105).

When the LU assignment response indicates that the LU assignment has been successfully done, the storage system 2 updates the external LU table 208 (S1106). Accordingly, the storage system 2 recognizes the LU assigned by the external storage system 2 as the external LU 282.

Specifically, the storage system 2 creates a new record in the external LU table 208. Then, the storage system 2 stores the LU ID contained in the received LU assignment response as the external LU ID 2081 of the new record.

After that, the storage system 2 stores the external LU type 2092 extracted in Step S1101 as the external LU type 2082 of the new record. Then, the storage system 2 stores the size contained in the received LU assignment response as the size 2083 of the new record.

Subsequently, the storage system 2 stores the storage ID 2071 extracted in Step S1102 as the storage ID 2084 of the new record. Then, the storage system 2 stores information indicating that the LU is assigned to the storage pool 285 as the assigned device type 2085 of the new record. After that, the storage system 2 stores the pool ID 2091 extracted in Step S1101 as the assigned device ID 2086 of the new record.

As described above, the storage system 2 updates the external LU table 208. Moreover, the storage system 2 adds to the page table 212 new records that correspond to all of real pages of the external LU 282. Then, the storage system 2 ends the external LU creation processing.

On the other hand, when the LU assignment response indicates LU assignment failure, the storage system 2 judges whether all the records included in the external storage table 207 have been selected in Step S1102 (S1107).

When even one of the records included in the external storage table 207 is not selected, the storage system 2 returns to Step S1102. Then, the storage system 2 selects an unselected record from the external storage table 207 and repeats the processing.

On the other hand, when all the records included in the external storage table 207 are selected, the storage system 2 notifies an error to the host computer 1 or the management terminal 3 (S1108) and ends the external LU creation processing.

Figure 19A:
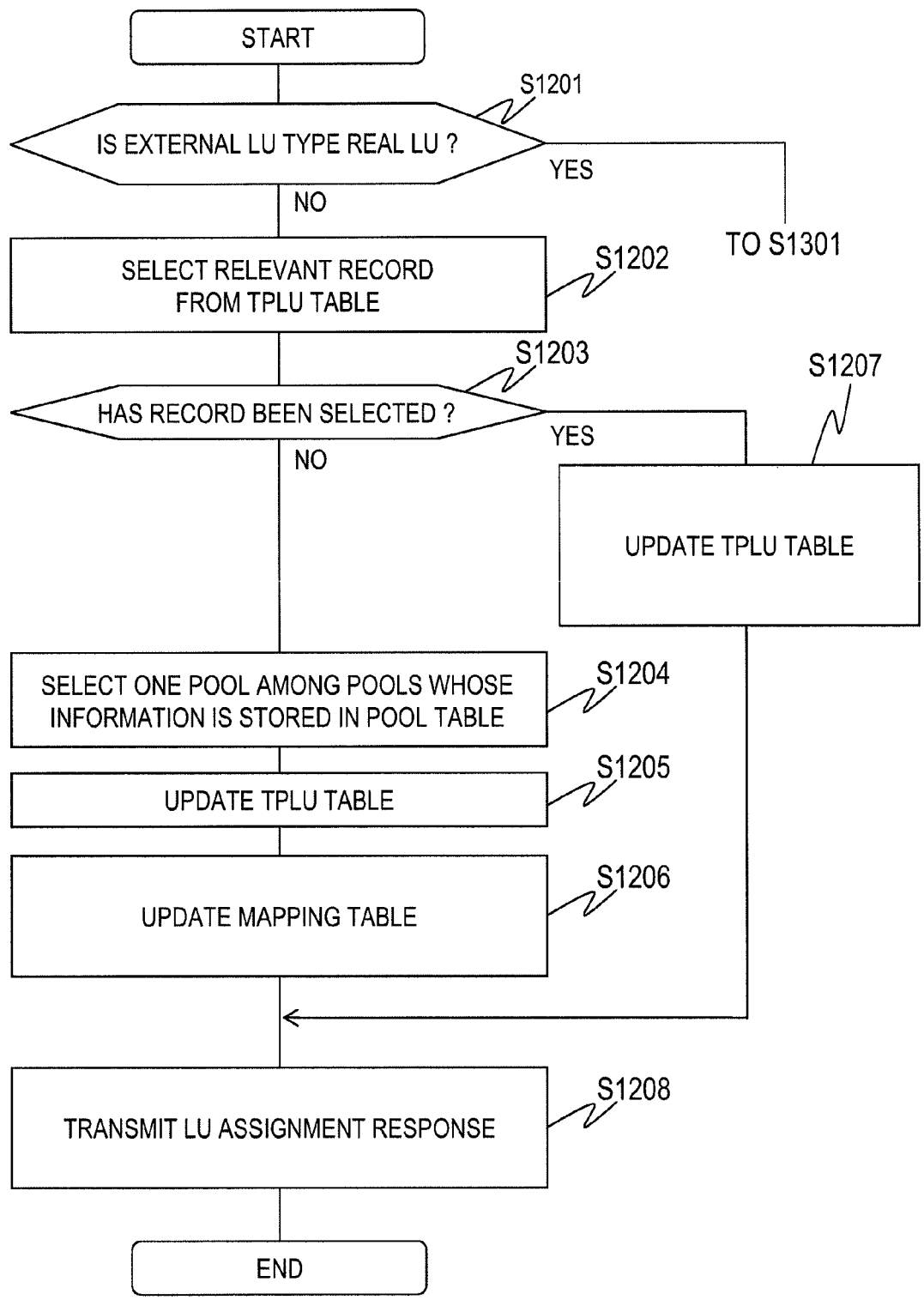
FIGS. 19A and 19B are flowcharts of the LU assignment processing executed by the external storage system in accordance with the first embodiment of this invention.
Figure 19B:
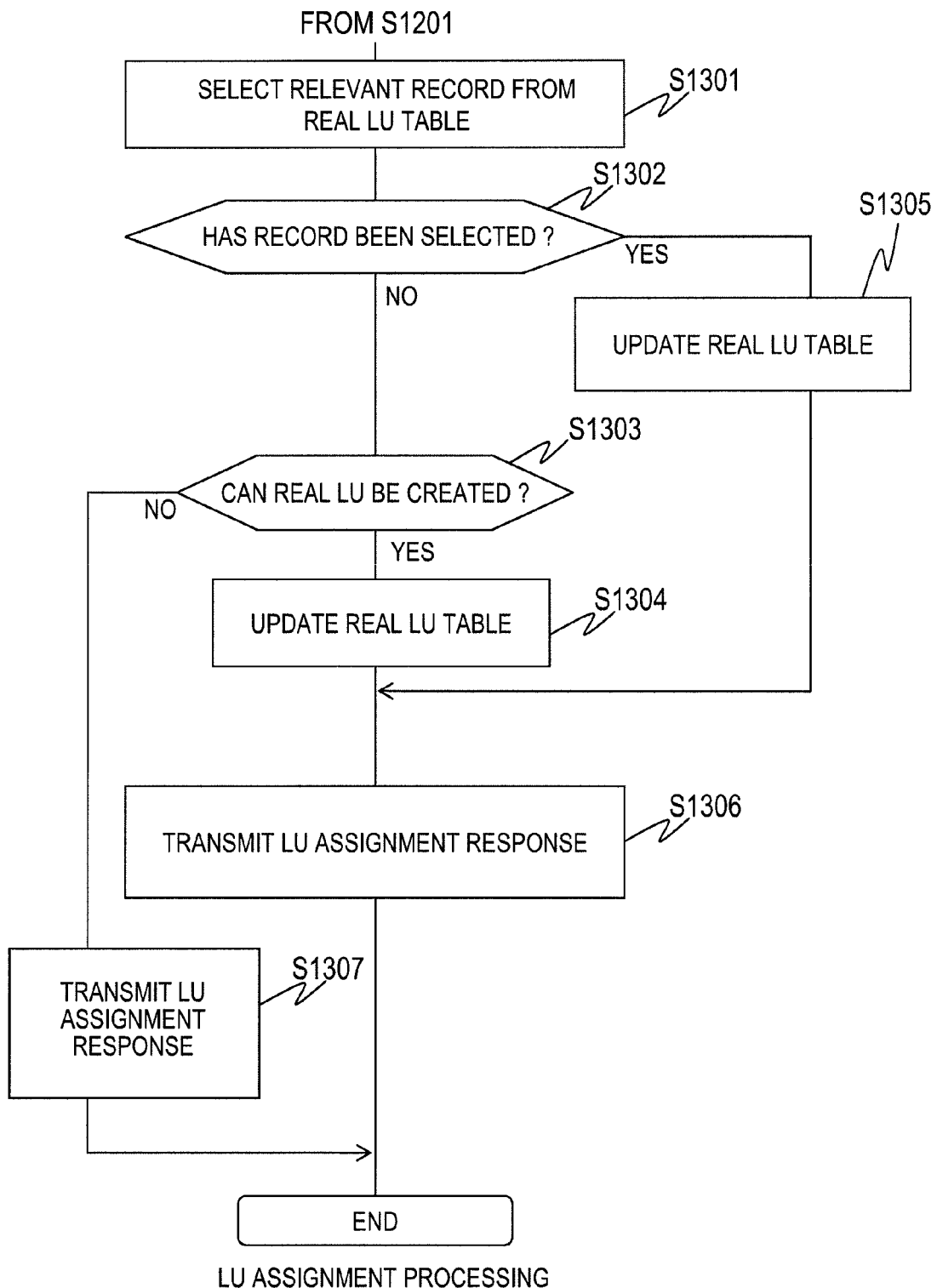

FIGS. 19A and 19B are flowcharts of the LU assignment processing executed by the external storage system 2 according to the first embodiment of this invention.

The CPU 24 of the external storage system 2 executes the LU assignment program 205 to thereby execute the LU assignment processing. It should be noted that upon reception of the LU assignment request in Step S1103 of the external LU creation processing shown in FIG. 18, the external storage system 2 executes the LU assignment processing.

First, the external storage system 2 extracts the external LU type 2092 and the external LU size 2093 from the received LU assignment request. Next, the external storage system 2 judges which of the real LU 281 and the TPLU 283 the extracted external LU type 2092 indicates (S1201).

When the external LU type 2092 indicates the TPLU 283, the LU assignment request is requesting assignment of the TPLU 283. Thus, the external storage system 2 selects from the TPLU table 210 all the records whose assigned device type 2104 and assigned device ID 2105 of the TPLU table 210 indicate an unassigned status. Next, the external storage system 2 selects from the selected records a record whose size 2102 of the TPLU table 210 is equal to or larger than the extracted external LU size 2093 (S1202).

Next, the external storage system 2 judges whether the record has been selected from the TPLU table 210 (S1203).

When the record is selected, it means that there exists a TPLU 283 that satisfies a condition designated by the received LU assignment request and that is unassigned.

Thus, the external storage system 2 updates the TPLU table 210 (Step S1207).

Specifically, the external storage system 2 stores information indicating the storage system 2 as the assigned device type 2104 of the selected record. Then, the external storage system 2 stores the identifier of the storage system 2 as the transmission source of the received LU assignment request as the assigned device ID 2105 of the selected record.

Accordingly, the external storage system 2 assigns the TPLU 283 that satisfies the condition designated by the received LU assignment request and that is unassigned to the storage system 2 as the transmission source of the received LU assignment request. Then, the external storage system 2 advances to Step S1208.

On the other hand, when the record is not selected, it means that there exists no TPLU 283 that satisfies a condition designated by the received LU assignment request and that is unassigned. Thus, the external storage system 2 newly creates a TPLU 283 that satisfies the condition designated by the received LU assignment request.

Specifically, the external storage system 2 arbitrarily selects one record from the pool table 209. For example, the external storage system 2 selects from the pool table 209 a record regarding the storage pool 285 having a largest unwritten storage area capacity (S1204). Then, the external storage system 2 extracts the pool ID 2091 from the selected record.

Next, the external storage system 2 updates the TPLU table 210 (S1205).

Specifically, the external storage system 2 creates a new record in the TPLU table 210. Then, the external storage system 2 stores a value that does not overlap any value of all the TPLU IDs 2101 included in the TPLU table 210 as the TPLU ID 2101 of the new record. After that, the external storage system 2 stores the external LU size 2093 extracted in Step S1201 as the size 2102 of the new record. Then, the external storage system 2 stores the extracted pool ID 2091 as the pool ID 2103 of the new record.

Next, the external storage system 2 stores information indicating the storage system 2 as the assigned device type 2104 of the new record. Then, the external storage device 2 stores the identifier of the storage system 2 as the transmission source of the received LU assignment request as the assigned device ID 2105 of the new record.

Accordingly, the external storage system 2 newly creates a TPLU 283 that satisfies the condition designated by the received LU assignment request. Then, the external storage system 2 assigns the newly-created TPLU 283 to the storage system 2 as the transmission source of the received LU assignment request.

Subsequently, the external storage system 2 stores information regarding all the pages included in the newly-created TPLU 283 in the mapping table 211.

Specifically, the external storage system 2 creates a new record in a number corresponding to the pages included in the created TPLU 283 in the mapping table 211.

Next, the external storage system 2 stores a value stored in the TPLU ID 2101 of the TPLU table 210 as the TPLU ID 2111 of all the new records. Then, the external storage system 2 stores identifiers of the pages included in the created TPLU 283 as the respective TP page numbers 2112 of the new records so that the identifiers do not overlap each other. After that, the external storage system 2 stores information indicating that the TP page is not accessed as the LU type 2113 of all the new records. It should be noted that the external storage 2 does not store any value as the storage ID 2114, the LU ID 2115, and the real page number 2116 of the new records.

As described above, the external storage system 2 updates the mapping table 211 (S1206).

Next, the external storage system 2 transmits the LU assignment response to the storage system 2 as the transmission source of the received LU assignment request (S1208). It should be noted that the LU assignment response indicates that the LU assignment to the storage system 2 as the transmission source of the LU assignment request has succeeded. Further, the LU assignment response contains an identifier of the assigned TPLU 283 (LU ID) and a size thereof.

Then, the external storage system 2 ends the LU assignment processing.

On the other hand, when the external LU type 2092 indicates the real LU 281, the LU assignment request is requesting assignment of the real LU 281. Thus, the external storage system 2 selects from the real LU table 206 all the records whose assigned device type 2063 and assigned device ID 2064 of the real LU table 206 indicate an unassigned status. Next, the external storage system 2 selects from the selected records a record whose size 2062 of the real LU table 206 is equal to or larger than the extracted external LU size 2093 (S1301).

Next, the external storage system 2 judges whether the record has been selected from the real LU table 206 (S1302).

When the record is selected, it means that there exists a real LU 281 that satisfies a condition designated by the received LU assignment request and that is unassigned.

Thus, the external storage system 2 updates the real LU table 206 (Step S1305).

Specifically, the external storage system 2 stores information indicating the storage system 2 as the assigned device type 2063 of the selected record. Then, the external storage device 2 stores the identifier of the storage system 2 as the transmission source of the received LU assignment request as the assigned device ID 2064 of the selected record.

Accordingly, the external storage system 2 assigns the real LU 281 that satisfies the condition designated by the received LU assignment request and that is unassigned to the storage system 2 as the transmission source of the received LU assignment request. Then, the external storage system 2 advances to Step S1306.

On the other hand, when the record is not selected, it means that there exists no real LU 281 that satisfies the condition designated by the received LU assignment request and that is unassigned. Thus, the external storage system 2 judges whether a real LU 281 that satisfies the condition designated by the received LU assignment request can be created. For example, the external storage system 2 judges whether a real LU 281 can be created based on whether a free capacity equal to or larger than the value of the extracted external LU size 2093 exists in the disk drive 28.

When it is judged that the real LU 281 cannot be created, the external storage system 2 transmits the LU assignment response to the storage system 2 as the transmission source of the received LU assignment request (S1307). It should be noted that the LU assignment response indicates that the LU assignment to the storage system 2 as the transmission source of the LU assignment request has failed.

Then, the external storage system 2 ends the LU assignment processing.

On the other hand, when it is judged that the real LU 281 can be created, the external storage system 2 newly creates a real LU 281 having a size of the extracted external LU size 2093.

Next, the external storage system 2 updates the real LU table 206 (S1304).

Specifically, the external storage system 2 creates a new record in the real LU table 206. Next, the external storage system 2 stores an identifier of the created real LU 281 as the real LU ID 2061 of the new record. Then, the external storage system 2 stores the extracted external LU size 2093 as the size 2062 of the new record.

Subsequently, the external storage system 2 stores information indicating the storage system 2 as the assigned device type 2063 of the new record. Then, the external storage system 2 stores the identifier of the storage system 2 as the transmission source of the received LU assignment request as the assigned device ID 2064 of the new record.

As described above, the external storage system 2 updates the real LU table 206.

Next, the external storage system 2 transmits the LU assignment response to the storage system 2 as the transmission source of the received LU assignment request (S1306). It should be noted that the LU assignment response indicates that the LU assignment to the storage system 2 as the transmission source of the LU assignment request has succeeded. Further, the LU assignment response contains an identifier of the assigned real LU 281 (LU ID) and a size thereof.

Then, the external storage system 2 ends the LU assignment processing.

Figure 20A:
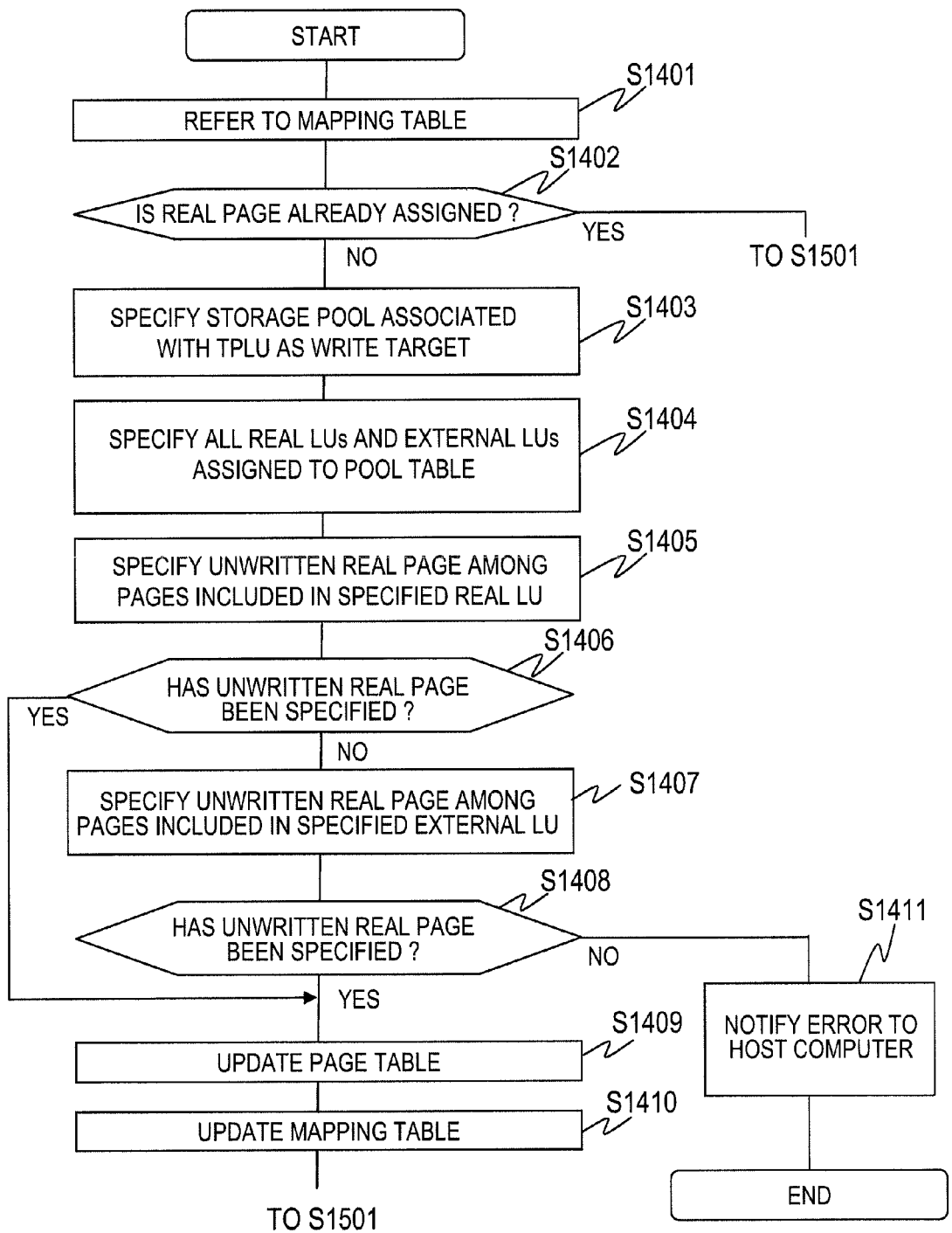
FIGS. 20A and 20B are flowcharts of the TP page write processing executed by the storage system in accordance with the first embodiment of this invention.
Figure 20B:
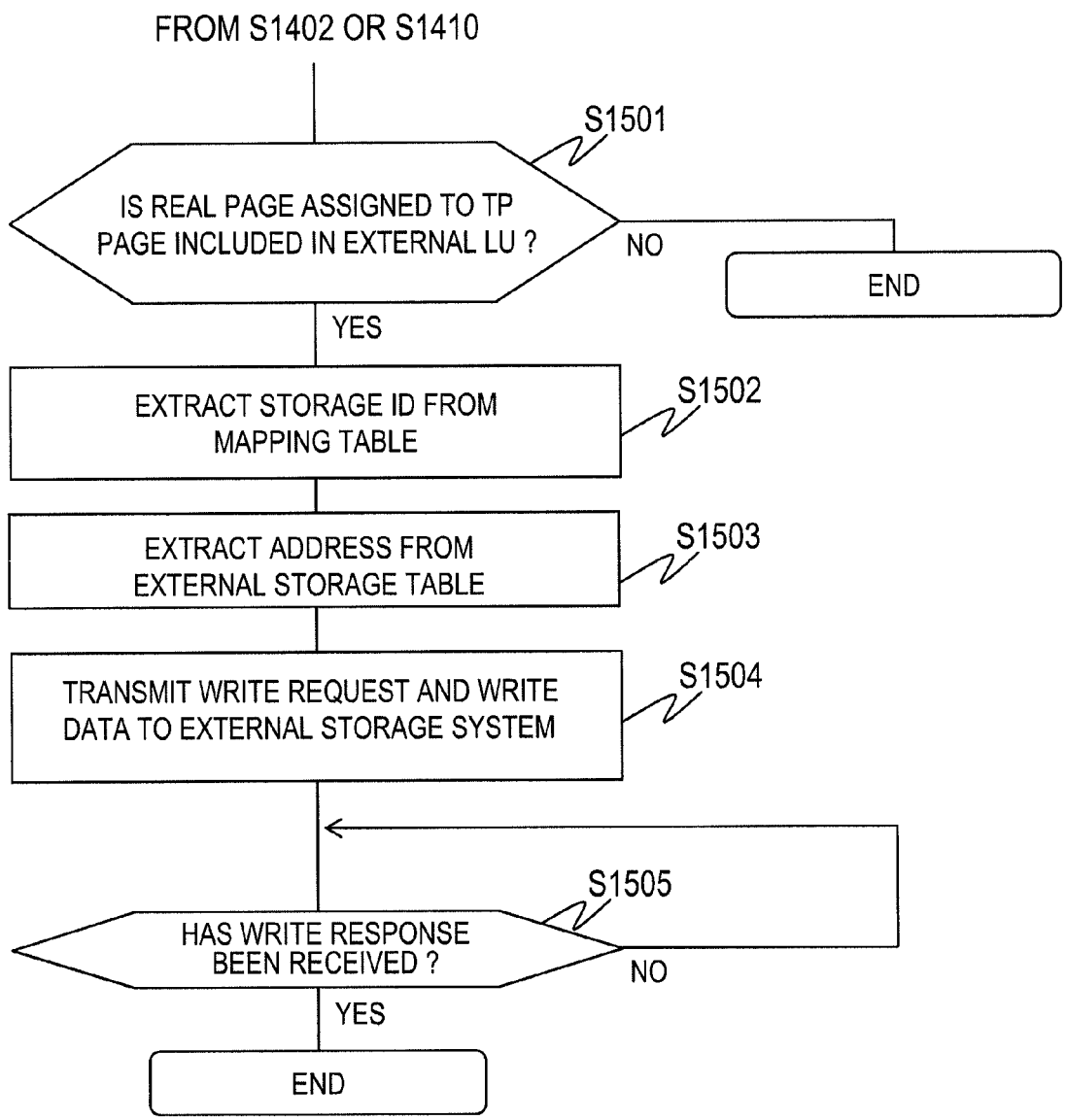

FIGS. 20A and 20B are flowcharts of the TP page write processing executed by the storage system 2 according to the first embodiment of this invention.

The CPU 24 of the storage system 2 executes the TP program 202 and the I/O processing program 204 to thereby execute the TP page write processing. It should be noted that the storage system 2 executes the TP page write processing upon reception of a write request to the TP page included in the TPLU 283.

First, the storage system 2 receives a write request to the TP page included in the TPLU 283 from the host computer 1. It should be noted that the write request includes an LU ID, an LBA (logical block address), and a write size of the data to be written. The storage system 2 extracts the LU ID, the LBA, and the write size with respect to the TPLU 283 from the received write request. Then, the storage system 2 calculates the page number of the TP page as the write target based on the extracted LBA and the extracted write size. In addition, the storage system 2 receives data to be written (write data) to the TP page from the host computer 1.

Thus, the storage system 2 stores the received write data in the cache memory 26 of the storage system 2. Then, the storage system 2 transmits a write response for notifying processing completion of the received write request to the host computer 1.

Next, the storage system 2 selects from the mapping table 211 records whose TPLU ID 2111 of the mapping table 211 matches the extracted LU ID. Next, the storage system 2 selects from the selected records a record whose TP page number 2112 of the mapping table 211 matches the calculated page number.

Next, the storage system 2 extracts the LU type 2113, the storage ID 2114, the LU ID 2115, and the real page number 2116 from the selected record (S1401).

Subsequently, the storage system 2 judges whether the extracted LU type 2113 is not accessed. Accordingly, the storage system 2 judges whether a real page is already assigned to the TP page as the data write target (S1402).

When the LU type 2113 indicates the real LU 281 or the external LU 282, the storage system 2 judges that the real page has already been assigned to the TP page as the data write target. In this case, the storage system 2 does not need to newly assign the real page to the TP page as the data write target. Thus, the storage system 2 advances to Step 1501 without any further process.

On the other hand, when the LU type 2113 indicates a not-accessed status, the storage system 2 judges that the real page is not yet assigned to the TP page as the data write target. In this case, the storage system 2 needs to assign the real page to the TP page as the data write target.

Thus, the storage system 2 selects from the TPLU table 210 a record whose TPLU ID 2101 of the TPLU table 210 matches the LU ID extracted from the write request. Next, the storage system 2 extracts the pool ID 2103 from the selected record. Accordingly, the storage system 2 specifies the storage pool 285 identified by the extracted pool ID 2103 as the storage pool 285 including a storage area that can be assigned to the TPLU 283 as the data write target (S1403).

Subsequently, the storage system 2 selects from the real LU table 206 a record whose assigned device ID 2064 of the real LU table 206 matches the extracted pool ID 2103. Then, the storage system 2 extracts the real LU ID 2061 from the selected record. Accordingly, the storage system 2 specifies the real LU 281 identified by the extracted real LU ID 2061 as the real LU 281 assigned to the specified storage pool 285.

Next, the storage system 2 selects from the external LU table 208 a record whose assigned device ID 2086 of the external LU table 208 matches the extracted pool ID. Then, the storage system 2 extracts the external LU ID 2081 and the storage ID 2084 from the selected record. Accordingly, the storage system 2 specifies the external LU 282 identified by the extracted external LU ID 2081 included in the storage system 2 identified by the extracted storage ID 2084 as the external LU 282 assigned to the specified storage pool 285 (S1404).

Next, the storage system 2 specifies an unwritten real page from the real pages included in the specified real LU 281 (S1405).

Specifically, the storage system 2 selects from the page table 212 all the records whose storage ID 2122 of the page table 212 is not stored with a value. Then, the storage system 2 selects from the selected records all the records whose LU ID 2123 of the page table 212 matches the extracted real LU ID 2061. After that, the storage system 2 selects from the selected records one of the records whose status 2125 of the page table 212 indicates the unwritten status.

Subsequently, the storage system 2 judges whether the record has been selected from the page table 212. Thus, the storage system 2 judges whether the unwritten real page has been specified from the real pages included in the specified real LU 281 (S1406).

When the record is selected, the storage system 2 judges that the unwritten real page has been specified from the real pages included in the specified real LU 281. Thus, the storage system 2 advances to Step S1409 without any further process.

On the other hand, when the record is not selected, the storage system 2 judges that the unwritten real page has not been specified from the real pages included in the specified real LU 281.

Thus, the storage system 2 specifies the unwritten real page from the real pages included in the specified external LU 282 (S1407).

Specifically, the storage system 2 selects from the page table 212 all the records whose storage ID 2122 of the page table 212 matches the extracted storage ID 2084. Next, the storage system 2 selects from the selected records all the records whose LU ID 2123 of the page table 212 matches the extracted external LU ID 2081. Then, the storage system 2 selects from the selected records one of the records whose status 2125 of the page table 212 indicates the unwritten status.

Subsequently, the storage system 2 judges whether the record has been selected from the page table 212. Accordingly, the storage system 2 judges whether the unwritten real page has been specified from the real pages included in the specified external LU 282 (S1408).

When the record is not selected, the storage system 2 judges that the unwritten real page has not been specified from the real pages included in the specified external LU 282. In this case, the storage system 2 cannot store the data requested for data write to the TP page. Thus, the storage system 2 notifies a write error to the host computer 1 (S1411). Then, the storage system 2 ends the TP page write processing.

On the other hand, when the record is selected, the storage system 2 judges that the unwritten real page has been specified from the real pages included in the specified external LU 282.

Thus, the storage system 2 updates the page table 212 (S1409).

Specifically, the storage system 2 stores information indicating a written status as the status 2125 of the record selected from the page table 212 in Steps S1405 and S1407. Then, the storage system 2 extracts the LU type 2121, the storage ID 2122, the LU ID 2123, and the real page number 2124 from the selected record.

Next, the storage system 2 updates the mapping table 211 (S1410).

Specifically, the storage system 2 selects from the mapping table 211 records whose TPLU ID 2111 of the mapping table 211 matches the LU ID extracted from the received write request. Then, the storage system 2 selects from the selected records a record whose TP page number 2112 of the mapping table 211 matches the calculated page number.

Subsequently, the storage system 2 stores the extracted LU type 2121 as the LU type 2113 of the selected record. Then, the storage system 2 stores the extracted storage ID 2122 as the storage ID 2114 of the selected record. After that, the storage system 2 stores the extracted LU ID 2123 as the LU ID 2115 of the selected record. Then, the storage system 2 stores the extracted real page number 2124 as the real page number 2116 of the selected record.

By updating the mapping table 211, the storage system 2 assigns a real page to the TP page as the data write target.

Next, the storage system 2 judges whether the real page assigned to the TP page as the data write target is included in the external LU 282 (S1501).

Specifically, the storage system 2 selects from the mapping table 211 records whose TPLU ID 2111 of the mapping table 211 matches the LU ID extracted from the received write request. Next, the storage system 2 selects from the selected records a record whose TP page number 2112 of the mapping table 211 matches the calculated page number.

Then, the storage system 2 extracts the LU type 2113 from the selected record. After that, the storage system 2 judges whether the extracted LU type 2113 indicates the external LU 282.

When the LU type 2113 indicates the real LU 281, the storage system 2 judges that the real page assigned to the TP page as the data write target is included in the real LU 281. Thus, the storage system 2 extracts the LU ID 2115 and the real page number 2116 from the selected record. Next, the storage system 2 writes the write data stored in the cache memory 26 in the real page identified by the extracted real page number 2116, which is included in the real LU 281 identified by the extracted LU ID 2115. Then, the storage system 2 ends the TP page write processing.

On the other hand, when the LU type 2113 indicates the external LU 282, the storage system 2 judges that the real page assigned to the TP page as the data write target is included in the external LU 282. Thus, the storage system 2 extracts the storage ID 2114, the LU ID 2115, and the real page number 2116 from the selected record (S1502).

Subsequently, the storage system 2 selects from the external storage table 207 a record whose storage ID 2071 of the external storage table 207 matches the extracted storage ID 2114. Then, the storage system 2 extracts the address 2072 from the selected record (S1503).

Next, the storage system 2 transmits a write request containing the extracted LU ID 2115 and the calculated LBA and write size to be written to the extracted address 2072. In addition, the storage system 2 transmits the write data stored in the cache memory 26 to the extracted address 2072. Thus, the storage system 2 transmits the write request and the write data to the external storage system 2 identified by the extracted storage ID 2114 (S1504). It should be noted that the write request requests data write to the real page identified by the extracted real page number 2116, which is included in the external LU 282 identified by the extracted LU ID 2115.

Upon reception of the write request and the write data, the external storage system 2 extracts the LU ID 2115, the LBA, and the write size from the received write request. When the LU identified by the extracted LU ID 2115 is the real LU 281, the external storage system 2 writes the received write data in the storage area identified by the extracted LBA and write size, which is included in the LU identified by the extracted LU ID 2115. On the other hand, when the LU identified by the extracted LU ID 2115 is the TPLU 283, the external storage system 2 calculates the page number of the TP page as the write target based on the extracted LBA and write size. Then, the external storage system 2 writes the received write data in the TP page identified by the calculated page number, which is included in the external LU 282 identified by the extracted LU ID 2115. After that, the external storage system 2 transmits a write response for notifying write completion to the storage system 2 as the transmission source of the write request.

On the other hand, upon transmission of the write request and the write data, the storage system 2 judges whether the write response has been received (S1505).

When the write response is not received, the storage system 2 waits until the write response is received. Then, upon reception of the write response, the storage system 2 ends the TP page write processing.

Figure 21:
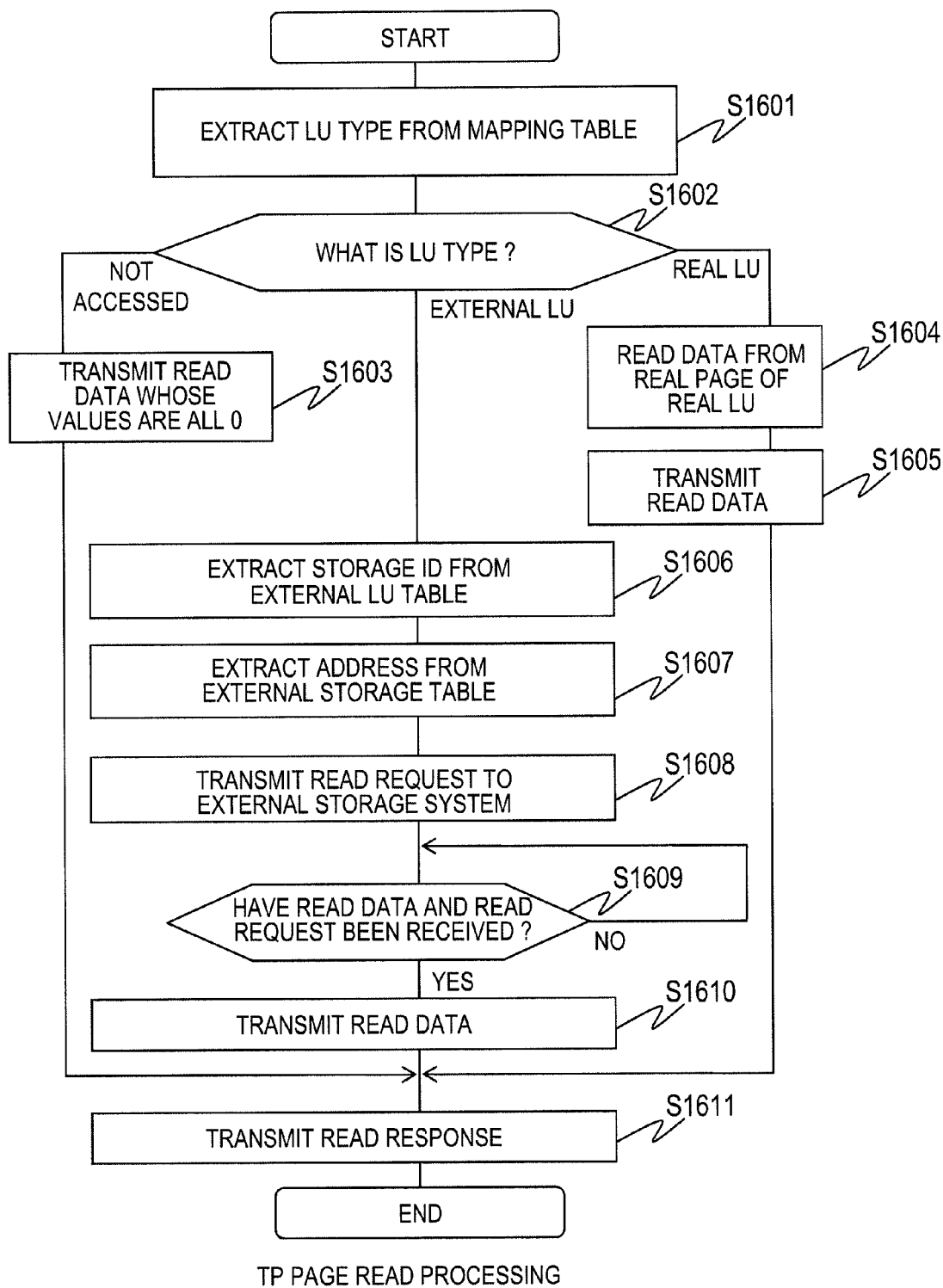
FIG. 21 is a flowchart of the TP page read processing executed by the storage system in accordance with the first embodiment of this invention.

FIG. 21 is a flowchart of the TP page read processing executed by the storage system 2 according to the first embodiment of this invention.

The CPU 24 of the storage system 2 executes the TP program 202 and the I/O processing program 204 to thereby execute the TP page read processing. It should be noted that the storage system 2 executes the TP page read processing upon reception of a read request that requests data read from the TP page included in the TPLU 283.

However, the storage system 2 does not execute the TP page read processing when the data requested for data read by the read request is stored in the cache memory 26. In this case, the storage system 2 reads the data requested for data read by the received read request from the cache memory 26 instead. Then, the storage system 2 transmits the read data and a read response to the host computer 1.

First, the storage system 2 receives the read request that requests data read from the TP page included in the TPLU 283 from the host computer 1. It should be noted that the read request includes an LU ID, an LBA, and a read size with respect to the TPLU 283 as a data read target.

Upon reception of the read request, the storage system 2 extracts the LU ID, the LBA, and the read size from the received read request. Next, the storage system 2 calculates the page number of the TP page as the read target based on the LBA and the extracted read size. Then, the storage system 2 selects from the mapping table 211 records whose TPLU ID 2111 of the mapping table 211 matches the extracted LU ID. After that, the storage system 2 selects from the selected records a record whose TP page number 2112 of the mapping table 211 matches the calculated page number.

Subsequently, the storage system 2 extracts the LU type 2113 from the selected record (S1601). Next, the storage system 2 judges which of the not-accessed status, the real LU 281, and the external LU 282 the extracted LU type 2113 indicates (S1602).

When the LU type 2113 indicates the not-accessed status, no data is written in the TP page as the data read target. Thus, the storage system 2 transmits all pieces of read data indicating a value "0" to the host computer 1 (S1603). In addition, the storage system 2 transmits a read response for notifying processing completion of the received read request to the host computer 1 (S1611). Then, the storage system 2 ends the TP page read processing.

On the other hand, when the LU type 2113 indicates the real LU 281, the storage system 2 judges that the real page assigned to the TP page as the data read target is included in the real LU 281. Thus, the storage system 2 extracts the LU ID 2115 and the real page number 2116 from the selected record. Next, the storage system 2 reads data from the real page identified by the extracted real page number 2116, which is included in the real LU 281 identified by the extracted LU ID 2115 (S1604).

Next, the storage system 2 transmits the read data to the host computer 1 (S1605). In addition, the storage system 2 transmits the read response for notifying the processing completion of the received read request to the host computer 1 (S1611).

At this time, because the transmission source of the received read request is the host computer 1, the storage system 2 stores the read data in the cache memory 26 of the storage system 2. Then, the storage system 2 ends the TP page read processing.

On the other hand, when the LU type 2113 indicates the external LU 282, the storage system 2 judges that the real page assigned to the TP page as the data read target is included in the external LU 282. Thus, the storage system 2 extracts the storage ID 2114, the LU ID 2115, and the real page number 2116 from the selected record (S1606).

Next, the storage system 2 selects from the external storage table 207 a record whose storage ID 2071 of the external storage table 207 matches the extracted storage ID 2114. Then, the storage system 2 extracts the address 2072 from the selected record (S1607).

Next, the storage system 2 calculates an LBA and the read size based on the extracted real page number 2116. Then, the storage system 2 transmits the read request including the extracted LU ID 2115 and the calculated address of the LBA and read size to the extracted address 2072. Accordingly, the storage system 2 transmits the read request to the external storage system 2 identified by the extracted storage ID 2114 (S1608). It should be noted that the read request requests data read from the real page identified by the extracted real page number 2116, which is included in the external LU 282 identified by the extracted LU ID 2115.

Upon reception of the read request, the external storage system 2 extracts the LU ID 2115, the LBA, and the read size from the received read request. When the LU identified by the extracted LU ID 2115 is the real LU 281, the external storage system 2 reads data from the storage area identified by the extracted LBA and read size, which is included in the LU identified by the extracted LU ID 2115. On the other hand, when the LU identified by the extracted LU ID 2115 is the TPLU 283, the external storage system 2 calculates the page number of the TP page as the read target based on the extracted LBA and read size. Then, the external storage system 2 reads data from the TP page identified by the calculated page number, which is included in the LU identified by the extracted LU ID 2115. Then, the external storage system 2 transmits the read data and the read response to the storage system 2 as the transmission source of the read request.

At this time, because the transmission source of the received read request is the storage system 2, the external storage system 2 does not store the read data in the cache memory 26 of the external storage system 2.

On the other hand, upon reception of the read request, the storage system 2 judges whether the read data and the read response have been received (S1609).

When even one of the read data and the read response is not received, the storage system 2 waits until the read data and the read response are received. Then, upon reception of the read data and the read response, the storage system 2 transmits the received read data to the host computer 1 (S1610). In addition, the storage system 2 transmits the read response for notifying processing completion of the received read request to the host computer 1 (S1611).

At this time, because the transmission source of the received read request is the host computer 1, the storage system 2 stores the read data in the cache memory 26 of the storage system 2. Then, the storage system 2 ends the TP page read processing.

As described above, according to the first embodiment of this invention, the storage system 2 can assign both the storage area of the real LU 281 and the storage area of the external LU 282 to a single TPLU 283.

(Second Embodiment)

In a second embodiment of this invention, the storage system 2 changes a storage destination of data requested for data write to the TPLU 283 from the real LU 281 to the external LU 282 according to an access status. Similarly, the storage system 2 changes the storage destination of the data requested for data write to the TPLU 283 from the external LU 282 to the real LU 281 according to the access status.

A configuration of a computer system according to the second embodiment of this invention is the same as that of the first embodiment except for the mapping table 211 stored in the storage system 2. The same components are denoted by the same reference numerals and descriptions thereof will thus be omitted. Further, the computer system according to the second embodiment of this invention executes the same processing as that of the first embodiment. Descriptions will be omitted for the same processing. In addition, the storage system 2 according to the second embodiment of this invention executes page transfer processing.

FIG. 22 is a configuration diagram of the mapping table 211 stored in the storage system 2 according to the second embodiment of this invention.

The mapping table 211 includes a TPLU ID 2111, a TP page number 2112, an LU type 2113, a storage ID 2114, an LU ID 2115, a real page number 2116, a last access time 2117, and the number of access 2118.

The TPLU ID 2111, the TP page number 2112, the LU type 2113, the storage ID 2114, the LU ID 2115, and the real page number 2116 are the same as those included in the mapping table 211 according to the first embodiment shown in FIG. 12. Therefore, descriptions thereof will be omitted.

The last access time 2117 indicates a time and date on which the TP page identified by the TPLU ID 2111 and the TP page number 2112 of the record concerned has been accessed last. The number of access 2118 indicates the number of access to the TP page identified by the TPLU ID 2111 and TP page number 2112 of the record concerned.

In the second embodiment of this invention, the storage system 2 stores a current time as the last access time 2117 of the record selected from the mapping table 211 in Step 1501 of the TP page write processing shown in FIGS. 20A and 20B. In addition, the storage system 2 increments the number of access 2118 of the record selected from the mapping table 211 by "1".

Specifically, the storage system 2 selects from the mapping table 211 a record regarding the TP page to which data is to be written at a time of writing the data to the TP page. Then, the storage system 2 updates the last access time 2117 and the number of access 2118 of the selected record.

Further, in the second embodiment of this invention, the storage system 2 stores a current time as the last access time 2117 of the record selected from the mapping tale 211 in Step 1601 of the TP page read processing shown in FIG. 21. In addition, the storage system 2 increments the number of access 2118 of the record selected from the mapping table 211 by "1".

Specifically, the storage system 2 selects from the mapping table 211 a record regarding the TP page from which data is to be read at a time of reading the data from the TP page. Then, the storage system 2 updates the last access time 2117 and the number of access 2118 of the selected record.

Figure 23A:
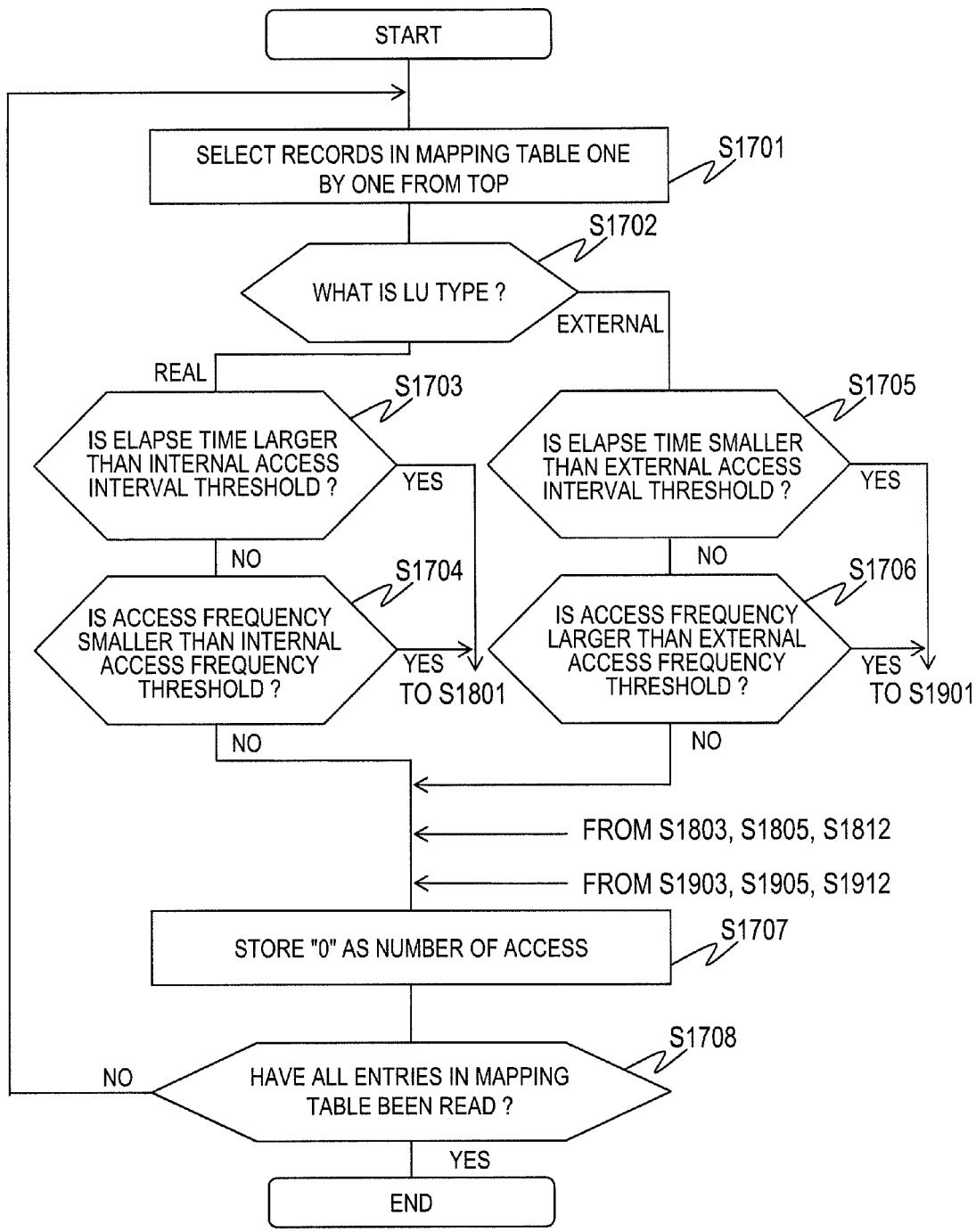
FIGS. 23A to 23C are flowcharts of the page transfer processing executed by the storage system in accordance with the second embodiment of this invention.
Figure 23B:
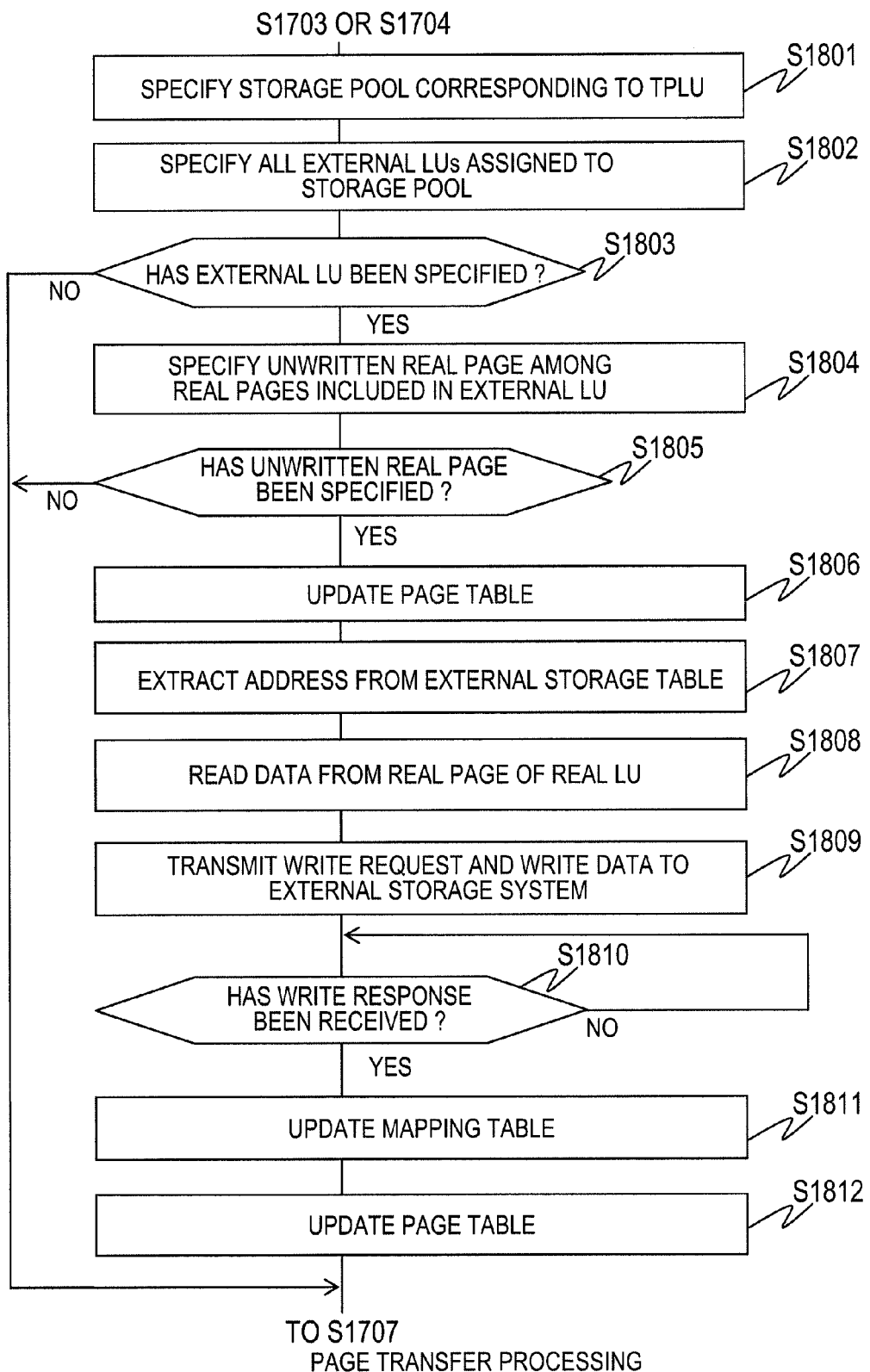
Figure 23C:
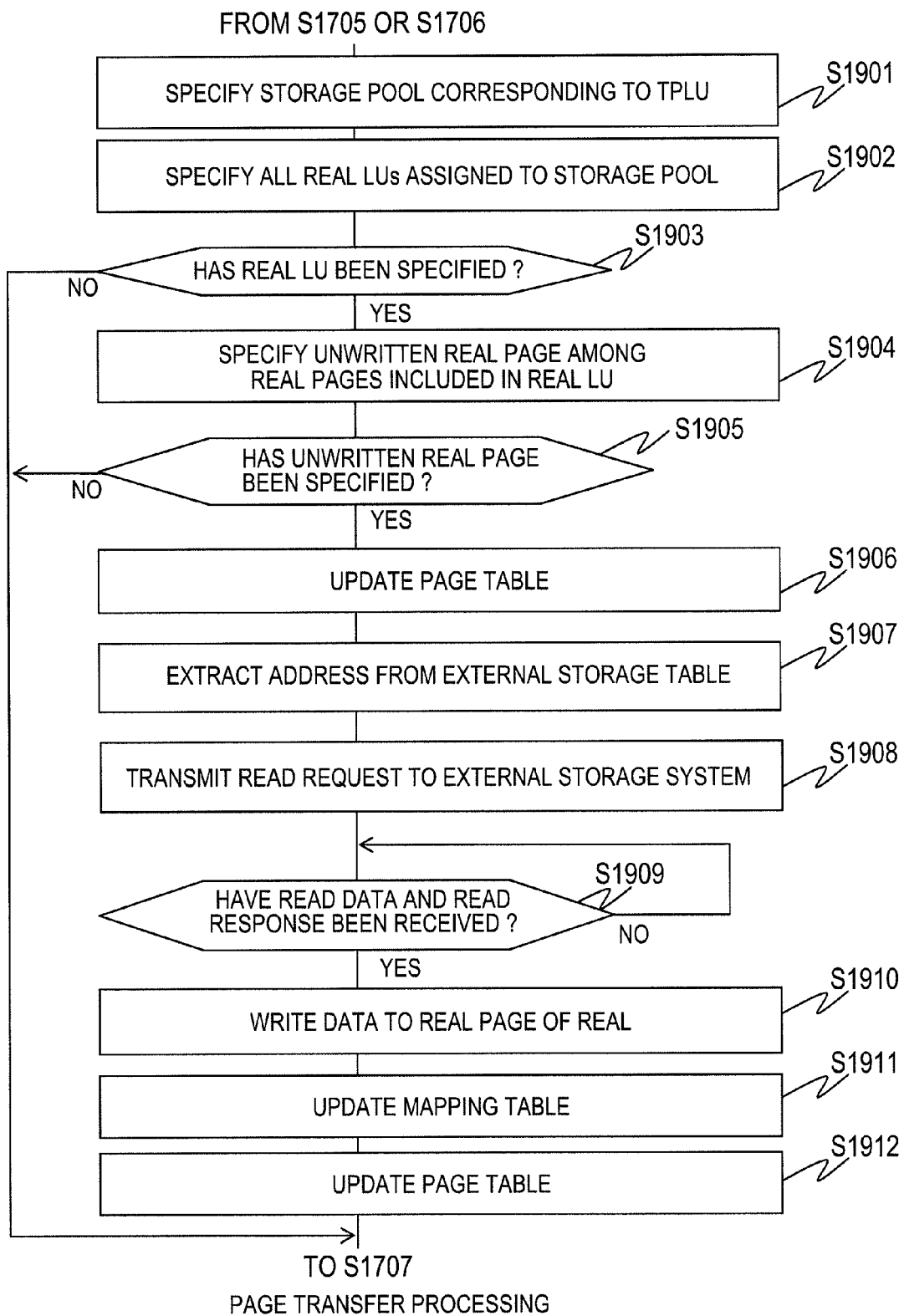

FIGS. 23A to 23C are flowcharts of the page transfer processing executed by the storage system 2 according to the second embodiment of this invention.

The CPU 24 of the storage system 2 executes the TP program 202 to thereby execute the page transfer processing at predetermined intervals.

First, the storage system 2 selects all the records included in the mapping table 211 one by one from the top (S1701).

Next, the storage system 2 executes the following processes for each selected record.

The storage system 2 extracts the LU type 2113 from the selected record. Then, the storage system 2 judges which of the not-accessed status, the real LU 281, and the external LU 282 the extracted LU type 2113 indicates (S1702).

When the LU type 2113 indicates the not-accessed status, it means that no data is written in the TP page corresponding to the selected record. Thus, the storage system 2 advances to Step S1708 without any further process.

On the other hand, when the LU type 2113 indicates the real LU 281, the storage system 2 judges that the real page assigned to the TP page corresponding to the selected record is included in the real LU 281.

Thus, the storage system 2 extracts the last access time 2117 and the number of access 2118 from the selected record. Next, the storage system 2 subtracts the last access time 2117 from the current time, to thereby calculate a time that has elapsed since the last access time 2117.

Next, the storage system 2 judges whether the calculated elapse time is larger than an internal access interval threshold (S1703). It should be noted that the internal access interval threshold is a threshold used for judging whether data requested for data write to the TP page corresponding to the selected record is to be transferred from the real LU 281 to the external LU 282. Further, the internal access interval threshold is set in advance by an administrator or the like.

When the elapse time is larger than the internal access interval threshold, the storage system 2 advances to Step S1801.

On the other hand, when the elapse time is equal to or smaller than the internal access interval threshold, the storage system 2 divides the extracted number of access 2118 by an execution interval of the page transfer processing. Thus, the storage system 2 calculates an access frequency with respect to the TP page corresponding to the selected record.

Next, the storage system 2 judges whether the calculated access frequency is smaller than the internal access frequency threshold (S1704). It should be noted that the internal access frequency threshold is a threshold used for judging whether the data requested for data write to the TP page corresponding to the selected record is to be transferred from the real LU 281 to the external LU 282. Further, the internal access frequency threshold is set in advance by the administrator or the like.

When the access frequency is smaller than the internal access frequency threshold, the storage system 2 advances to Step S1801.

On the other hand, when the access frequency is equal to or larger than the internal access frequency threshold, the storage system 2 stores "0" as the number of access 2118 of the record selected from the mapping table 211 in Step S1701 (S1707).

Next, the storage system 2 judges whether all the records included in the mapping table 211 have been selected in Step S1701 (S1708). When even one of the records included in the mapping table 211 is not selected, the storage system 2 returns to Step S1701. Then, the storage system 2 selects an unselected record from the mapping table 211 and repeats the processing.

On the other hand, when all the records included in the mapping table 211 are selected, the storage system 2 ends the page transfer processing.

In Step S1801, the storage system 2 extracts the TPLU ID 2111 from the record selected from the mapping table 211 in Step S1701.

Next, the storage system 2 selects from the TPLU table 210 a record whose TPLU ID 2101 of the TPLU table 210 matches the extracted TPLU ID 2111. Then, the storage system 2 extracts the pool ID 2103 from the selected record. Accordingly, the storage system 2 specifies the storage pool 285 identified by the extracted pool ID 2103 as the storage pool 285 including a storage area assigned to the TPLU 283 identified by the extracted TPLU ID 2111.

Next, the storage system 2 selects from the external LU table 208 a record whose assigned device ID 2086 of the external LU table 208 matches the extracted pool ID 2103. Then, the storage system 2 extracts the external LU ID 2081 and the storage ID 2084 from the selected record. Accordingly, the storage system 2 specifies the external LU 282 identified by the extracted external LU ID 2081, which is included in the storage system 2 identified by the extracted storage ID 2084, as the external LU 282 assigned to the specified storage pool 285 (S1802).

Subsequently, the storage system 2 judges whether the record whose assigned device ID 2086 of the external LU table 208 matches the extracted pool ID 2103 has been selected from the external LU table 208. Accordingly, the storage system 2 judges whether the external LU 282 assigned to the specified storage pool 285 has been specified (S1803).

When the record is not selected from the external LU table 208, it means that there is no external LU 282 assigned to the specified storage pool 285. In other words, the storage system 2 cannot specify the external LU 282 assigned to the specified storage pool 285. Accordingly, the storage system 2 cannot transfer the data requested for data write to the TP page corresponding to the record selected from the mapping table 211 from the real LU 281 to the external LU 282. Thus, the storage system 2 advances to Step S1707 without any further process.

On the other hand, when the record is selected from the external LU table 208, the storage system 2 judges that the external LU 282 assigned to the specified storage pool 285 has been specified. Thus, the storage system 2 specifies an unwritten real page from the real pages included in the specified external LU 282 (S1804).

Specifically, the storage system 2 selects from the page table 212 all the records whose storage ID 2122 of the page table 212 matches the extracted storage ID 2084. Next, the storage system 2 selects from the selected records all the records whose LU ID 2123 of the page table 212 matches the extracted external LU ID 2081. Then, the storage system 2 selects from the selected records one of the records whose status 2125 of the page table 212 indicates the unwritten status.

Subsequently, the storage system 2 judges whether the record has been selected from the page table 212. Accordingly, the storage system 2 judges whether the unwritten real page has been specified from the real pages included in the specified external LU 282 (S1805).

When the record is not selected, the storage system 2 judges that the unwritten real page has not been specified from the real pages included in the specified external LU 282. In this case, the storage system 2 cannot transfer the data requested for data write to the TP page corresponding to the record selected from the mapping table 211 from the real LU 281 to the external LU 282. Thus, the storage system 2 advances to Step S1707 without any further process.

On the other hand, when the record is selected, the storage system 2 judges that the unwritten real page has been specified from the real pages included in the specified external LU 282.

Then, the storage system 2 updates the page table 212 (S1806).

Specifically, the storage system 2 stores information indicating the written status as the status 2125 of the record selected from the page table 212 in Step S1804. Next, the storage system 2 extracts the storage ID 2122, the LU ID 2123, and the real page number 2124 from the selected record.

Next, the storage system 2 selects from the external storage table 207 a record whose storage ID 2071 of the external storage table 207 matches the extracted storage ID 2122. Next, the storage system 2 extracts the address 2072 from the selected record (S1807). It should be noted that the extracted address 2072 is an IP address of the external storage system 2 as the provider of the external LU 282 including the specified unwritten real page.

Subsequently, the storage system 2 extracts the LU ID 2115 and the real page number 2116 from the record selected from the mapping table 211 in Step S1701. Then, the storage system 2 reads data from the real page identified by the extracted real page number 2116, which is included in the real LU 281 identified by the extracted LU ID 2115 (S1808).

Next, the storage system 2 calculates an LBA and the write size based on the extracted real page number 2116. Then, the storage system 2 transmits the write request containing the extracted LU ID 2123 and the calculated the LBA and write size to the extracted address 2072. In addition, the storage system 2 transmits the data read from the real page to the extracted address 2072 as write data. In other words, the storage system 2 transmits the write request and the write data to the external storage system 2 (S1809). Accordingly, the storage system 2 transfers the data requested for data write to the TP page from the real page included in the real LU 281 to the real page included in the external LU 282.

It should be noted that the write request requests data write to the real page identified by the extracted real page number 2124, which is included in the external LU 282 identified by the extracted LU ID 2123.

Upon reception of the write request and the write data, the external storage system 2 extracts the LU ID 2123, the LBA, and the write size from the received write request. When the LU identified by the extracted LU ID 2123 is the real LU 281, the external storage system 2 writes the received write data in the storage area identified by the extracted LBA and the extracted write size, which is included in the LU identified by the extracted LU ID 2123. On the other hand, when the LU identified by the extracted LU ID 2123 is the TPLU 283, the external storage system 2 calculates the page number of the TP page as the write target based on the extracted LBA and the extracted write size. Then, the external storage system 2 writes the received write data in the TP page identified by the calculated page number, which is included in the LU identified by the extracted LU ID 2123. After that, the external storage system 2 transmits a write response for notifying write completion to the storage system 2 as the transmission source of the write request.

On the other hand, upon transmission of the write request and the write data, the storage system 2 judges whether the write response has been received (S1810).

When the write response is not received, the storage system 2 waits until the write response is received. Upon reception of the write response, the storage system 2 updates the mapping table 211 (S1811).

Specifically, the storage system 2 stores information indicating the external LU 282 as the LU type 2113 of the record selected from the mapping table 211 in Step S1701. Next, the storage system 2 stores the storage ID 2122 extracted in Step S1806 as the storage ID 2114 of the selected record. Then, the storage system 2 stores the LU ID 2123 extracted in Step S1806 as the LU ID 2115 of the selected record. After that, the storage system 2 stores the real page number 2124 extracted in Step S1806 as the real page number 2116 of the selected record.

Accordingly, the storage system 2 changes the storage destination of the data requested for data write to the TP page from the real page included in the real LU 281 to the real page included in the external LU 282.

Next, the storage system 2 updates the page table 212 (S1812).

Specifically, the storage system 2 selects from the page table 212 all the records whose storage ID 2122 of the page table 212 is not stored with any value. Next, the storage system 2 selects, from the selected records, records whose LU ID 2123 of the page table 212 matches the LU ID 2115 extracted in Step S1808. Then, the storage system 2 selects from the selected records a record whose real page number 2124 of the page table 212 matches the real page number 2116 extracted in Step S1808. After that, the storage system 2 stores information indicating the unwritten status as the status 2125 of the selected record.

Accordingly, the storage system 2 sets the real page of a data transfer source as the unwritten area. Then, the storage system 2 stores "0" as the number of access 2118 of the record selected from the mapping table 211 in Step S1701 (S1707).

Subsequently, the storage system 2 judges whether all the records included in the mapping table 211 have been selected in Step S1701 (S1708). When even one of the records included in the mapping table 211 is not selected, the storage system 2 returns to Step S1701. Then, the storage system 2 selects an unselected record from the mapping table 211 and repeats the processing.

On the other hand, when all the records included in the mapping table 211 are selected, the storage system 2 ends the page transfer processing.

On the other hand, when the LU type 2113 indicates the external LU 282 in Step S1702, the storage system 2 judges that the real page assigned to the TP page corresponding to the selected record is included in external LU 282.

Thus, the storage system 2 extracts the last access time 2117 and the number of access 2118 from the selected record. Next, the storage system 2 subtracts the last access time 2117 from the current time, to thereby calculate a time that has elapsed since the last access time 2117.

Next, the storage system 2 judges whether the calculated elapse time is smaller than an external access interval threshold (S1705). It should be noted that the external access interval threshold is a threshold used for judging whether data requested for data write to the TP page corresponding to the selected record is to be transferred from the external LU 282 to the real LU 281. Further, the external access interval threshold is set in advance by an administrator or the like.

When the elapse time is smaller than the external access interval threshold, the storage system 2 advances to Step S1901.

On the other hand, when the elapse time is equal to or larger than the external access interval threshold, the storage system 2 divides the extracted number of access 2118 by an execution interval of the page transfer processing. Thus, the storage system 2 calculates an access frequency with respect to the TP page corresponding to the selected record.

Next, the storage system 2 judges whether the calculated access frequency is larger than an external access frequency threshold (S1706). It should be noted that the external access frequency threshold is a threshold used for judging whether the data requested for data write to the TP page corresponding to the selected record is to be transferred from the external LU 282 to the real LU 281. Further, the external access frequency threshold is set in advance by the administrator or the like.

When the access frequency is larger than the external access frequency threshold, the storage system 2 advances to Step S1901.

On the other hand, when the access frequency is equal to or smaller than the external access frequency threshold, the storage system 2 stores "0" as the number of access 2118 of the record selected from the mapping table 211 in Step S1701 (S1707).

Next, the storage system 2 judges whether all the records included in the mapping table 211 have been selected in Step S1701 (S1708). When even one of the records included in the mapping table 211 is not selected, the storage system 2 returns to Step S1701. Then, the storage system 2 selects an unselected record from the mapping table 211 and repeats the processing.

On the other hand, when all the records included in the mapping table 211 are selected, the storage system 2 ends the page transfer processing.

In Step S1901, the storage system 2 extracts the TPLU ID 2111 from the record selected from the mapping table 211 in Step S1701.

Next, the storage system 2 selects from the TPLU table 210 a record whose TPLU ID 2101 of the TPLU table 210 matches the extracted TPLU ID 2111. Then, the storage system 2 extracts the pool ID 2103 from the selected record. Accordingly, the storage system 2 specifies the storage pool 285 identified by the extracted pool ID 2103 as the storage pool 285 including a storage area assigned to the TPLU 283 identified by the extracted TPLU ID 2111.

Next, the storage system 2 selects from the real LU table 206 a record whose assigned device ID 2064 of the real LU table 206 matches the extracted pool ID 2103. Then, the storage system 2 extracts the real LU ID 2061 from the selected record. Accordingly, the storage system 2 specifies the real LU 281 identified by the extracted real LU ID 2061 as the real LU 281 assigned to the specified storage pool 285 (S1902).

Subsequently, the storage system 2 judges whether the record whose assigned device ID 2064 of the real LU table 206 matches the extracted pool ID 2103 has been selected from the real LU table 206. Accordingly, the storage system 2 judges whether the real LU 281 assigned to the specified storage pool 285 has been specified (S1903).

When the record is not selected from the real LU table 206, it means that there is no real LU 281 assigned to the specified storage pool 285. In other words, the storage system 2 cannot specify the real LU 281 assigned to the specified storage pool 285. Accordingly, the storage system 2 cannot transfer the data requested for data write to the TP page corresponding to the record selected from the mapping table 211 from the external LU 282 to the real LU 281. Thus, the storage system 2 advances to Step S1707 without any further process.

On the other hand, when the record is selected from the real LU table 206, the storage system 2 judges that the real LU 281 assigned to the specified storage pool 285 has been specified. Thus, the storage system 2 specifies an unwritten real page from the real pages included in the specified real LU 281 (S1904).

Specifically, the storage system 2 selects from the page table 212 records whose storage ID 2122 of the page table 212 is not stored with any value. Next, the storage system 2 selects from the selected records all the records whose LU ID 2123 of the page table 212 matches the extracted real LU ID 2061. Then, the storage system 2 selects from the selected records one of the records whose status 2125 of the page table 212 indicates the unwritten status.

Subsequently, the storage system 2 judges whether the record has been selected from the page table 212. Accordingly, the storage system 2 judges whether the unwritten real page has been specified from the real pages included in the specified real LU 281 (S1905).

When the record is not selected, the storage system 2 judges that the unwritten real page has not been specified from the real pages included in the specified real LU 281. In this case, the storage system 2 cannot transfer the data requested for data write to the TP page corresponding to the record selected from the mapping table 211 from the external LU 282 to the real LU 281. Thus, the storage system 2 advances to Step S1707 without any further process.

On the other hand, when the record is selected, the storage system 2 judges that the unwritten real page has been specified from the real pages included in the specified real LU 281.

Then, the storage system 2 updates the page table 212 (S1906).

Specifically, the storage system 2 stores information indicating the written status as the status 2125 of the record selected from the page table 212 in Step S1904. Next, the storage system 2 extracts the LU ID 2123 and the real page number 2124 from the selected record.

Subsequently, the storage system 2 extracts the storage ID 2114, the LU ID 2115, and the real page number 2116 from the record selected from the mapping table 211 in Step S1701.

Next, the storage system 2 selects from the external storage table 207 a record whose storage ID 2071 of the external storage table 207 matches the extracted storage ID 2114. Then, the storage system 2 extracts the address 2072 from the selected record (S1907). It should be noted that the extracted address 2072 is an IP address of the external storage system 2 including the external LU 282 having the real page storing the data requested for data write to the TP page.

Next, the storage system 2 calculates an LBA and the write size based on the extracted real page number 2116. Then, the storage system 2 transmits the read request containing the extracted LU ID 2115 and the calculated LBA and the read size to the extracted address 2072. Thus, the storage system 2 transmits the read request to the external storage system 2 (S1908). It should be noted that the read request requests data read from the real page identified by the extracted real page number 2116, which is included in the external LU 282 identified by the extracted LU ID 2115.

Upon reception of the read request, the external storage system 2 extracts the LU ID 2115, the LBA, and the read size from the received read request. When the LU identified by the extracted LU ID 2115 is the real LU 281, the external storage system 2 reads the data from the storage area identified by the extracted LBA and the extracted read size, which is included in the LU identified by the extracted LU ID 2115. On the other hand, when the LU identified by the extracted LU ID 2115 is the TPLU 283, the external storage system 2 calculates the page number of the TP page as the read target based on the extracted LBA and the extracted read size. Then, the external storage system 2 reads the data from the TP page identified by the calculated page number, which is included in the LU identified by the extracted LU ID 2115. After that, the external storage system 2 transmits the read data to the storage system 2 as the transmission source of the read request. In addition, the external storage system 2 transmits a read response for notifying read completion to the storage system 2 as the transmission source of the read request.

On the other hand, upon transmission of the read request, the storage system 2 judges whether the read data and the read response have been received (S1909).

When even one of the read data and the read response is not received, the storage system 2 waits until the read data and the read response are received. Upon reception of the read data and the read response, the storage system 2 writes the received read data in the real page identified by the extracted real page number 2124, which is included in the real LU 281 identified by the extracted LU ID 2123 (S1910). Accordingly, the storage system 2 transfers the data requested for data write to the TP page from the real page included in the external LU 282 to the real page included in the real LU 281.

Next, the storage system 2 updates the mapping table 211 (S1911).

Specifically, the storage system 2 stores information indicating the real LU 281 as the LU type 2113 of the record selected from the mapping table 211 in Step S1701. Next, the storage system 2 deletes the value stored as the storage ID 2114 of the selected record. Then, the storage system 2 stores the LU ID 2123 extracted in Step S1906 as the LU ID 2115 of the selected record. After that, the storage system 2 stores the real page number 2124 extracted in Step S1906 as the real page number 2116 of the selected record. Accordingly, the storage system 2 changes the storage destination of the data requested for data write to the TP page from the real page included in the external LU 282 to the real page included in the real LU 281.

Next, the storage system 2 updates the page table 212 (S1912).

Specifically, the storage system 2 selects from the page table 212 all the records whose storage ID 2122 of the page table 212 matches the storage ID 2114 extracted in Step S1907. Next, the storage system 2 selects, from the selected records, records whose LU ID 2123 of the page table 212 matches the LU ID 2115 extracted in Step S1907. Then, the storage system 2 selects from the selected records a record whose real page number 2124 of the page table 212 matches the real page number 2116 extracted in Step S1907. After that, the storage system 2 stores information indicating the unwritten status as the status 2125 of the selected record.

Accordingly, the storage system 2 sets the real page of a data transfer source as the unwritten area. Then, the storage system 2 advances to Step S1707.

The storage system 2 stores "0" as the number of access 2118 of the record selected from the mapping table 211 in Step S1701 (S1707).

Subsequently, the storage system 2 judges whether all the records included in the mapping table 211 have been selected in Step S1701 (S1708). When even one of the records included in the mapping table 211 is not selected, the storage system 2 returns to Step S1701. Then, the storage system 2 selects an unselected record from the mapping table 211 and repeats the processing.

On the other hand, when all the records included in the mapping table 211 are selected, the storage system 2 ends the page transfer processing.

It should be noted that the last access time 2117 of the mapping table 211 may include a time of last access made by the read request and a time of last access made by the write request. In addition, the number of access 2118 of the mapping table 211 may include the number of access made by the read request and the number of access made by the write request.

In this case, the internal access interval threshold includes an internal access interval threshold for the read request and an internal access interval threshold for the write request. It should be noted that the internal access interval threshold for the read request is effective when set with a value larger than the internal access interval threshold for the write request. This is because the host computer 1 does not recognize a delay of the processing regarding the write request although recognizes the delay of the processing regarding the read request.

In Step S1703 of the page transfer processing, the storage system 2 judges whether the elapse time since the time of the last access made by the read request is larger than the internal access interval threshold for the read request. In addition, the storage system 2 judges whether the elapse time since the time of the last access made by the write request is larger than the internal access interval threshold for the write request.

Then, based on the two judgment results, the storage system 2 judges which of Steps S1704 and S1801 the process is to be advanced to.

Further, the internal access frequency threshold includes an internal access frequency threshold for the read request and an internal access frequency threshold for the write request. It should be noted that the internal access frequency threshold for the read request is effective when set with a value smaller than the internal access frequency threshold for the write request. This is because the host computer 1 does not recognize the delay of the processing regarding the write request although recognizes the delay of the processing regarding the read request.

In Step S1704 of the page transfer processing, the storage system 2 judges whether the access frequency by the read request is smaller than the internal access frequency threshold for the read request. In addition, the storage system 2 judges whether the access frequency by the write request is smaller than the internal access frequency threshold for the write request.

Then, based on the two judgment results, the storage system 2 judges which of Steps S1707 and S1801 the process is to be advanced to.

Further, the external access interval threshold includes an external access interval threshold for the read request and an external access interval threshold for the write request. It should be noted that the external access interval threshold for the read request is effective when set with a value larger than the external access interval threshold for the write request. This is because the host computer 1 does not recognize the delay of the processing regarding the write request although recognizes the delay of the processing regarding the read request.

In Step S1705 of the page transfer processing, the storage system 2 judges whether the elapse time since the time of the last access made by the read request is smaller than the external access interval threshold for the read request. In addition, the storage system 2 judges whether the elapse time since the time of the last access made by the write request is smaller than the external access interval threshold for the write request.

Then, based on the two judgment results, the storage system 2 judges which of Steps S1706 and S1901 the process is to be advanced to.

Further, the external access frequency threshold includes an external access frequency threshold for the read request and an external access frequency threshold for the write request. It should be noted that the external access frequency threshold for the read request is effective when set with a value smaller than the external access frequency threshold for the write request. This is because the host computer 1 does not recognize the delay of the processing regarding the write request although recognizes the delay of the processing regarding the read request.

In Step S1706 of the page transfer processing, the storage system 2 judges whether the access frequency by the read request is larger than the external access frequency threshold for the read request. In addition, the storage system 2 judges whether the access frequency by the write request is larger than the external access frequency threshold for the write request.

Then, based on the two judgment results, the storage system 2 judges which of Steps S1707 and S1901 the process is to be advanced to.

As described above, according to the second embodiment of this invention, the storage system 2 changes the storage destination of the data requested for data write to the TPLU 283 from the real LU 281 to the external LU 282 according to the access status. For example, the storage system 2 changes the storage destination of the data with a low access frequency from the real LU 281 to the external LU 282.

Further, the storage system 2 changes the storage destination of the data requested for data write to the TPLU 283 from the external LU 282 to the real LU 281 according to the access status. For example, the storage system 2 changes the storage destination of the data with a high access frequency from the external LU 282 to the real LU 281.

Accordingly, the storage system 2 can reduce a response time with respect to the host computer 1.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
a first storage system coupled to a computer; and
a second storage system coupled to the first storage system;
wherein the first storage system includes:
a plurality of first storage devices; and a first controller providing a thin provisioning logical volume (LU) to the computer;
wherein the second storage system includes:
a plurality of second storage devices; and
a second controller providing an external thin provisioning LU to the first storage system;
wherein the first controller is configured to:
provide pool areas, which are associated with the thin provisioning LU, including a first pool area mapped to the external thin provisioning LU, and,
allocate the first pool area to a first region in the thin provisioning LU to store a write data to the first region in the thin provisioning LU from the computer; and
wherein the second controller is configured to allocate at least one of a plurality of external pool areas, which are provided by at least one of the second storage devices, associated with the external thin provisioning LU to store the write data to the first region in the thin provisioning LU.

2. The storage system according to claim 1, wherein the pool areas associated with the thin provisioning LU include a second pool area mapped to a storage area provided by at least one of the plurality of first storage devices, and the first controller is configured to allocate the second pool area to store a write data to a second region in the thin provisioning LU from the computer.

3. The storage system according to claim 2, wherein the first controller is configured to:
copy data from the storage area, mapped to the second pool area, provided by at least one of the plurality of first physical devices, to a storage area provided by the at least one of the second storage devices based on an access status of a second region in the thin provisioning LU, and
change an allocation to the second region from the second pool area to a third pool area so that the write data to the second region is stored in the storage area provided by the at least one of the second storage devices.

4. The storage system according to claim 3, wherein the data having an access frequency less than a predetermined value is copied.

5. The storage system according to claim 3, wherein the data having an elapsed time from the last access time larger than a predetermined value is copied.

6. The storage system according to claim 1, wherein the first controller is configured to:
copy data from the storage area, which is provided by at least one of the plurality of the second storage devices, and corresponds to a first pool area allocated to a first region in the thin provisioning LU, to a storage area provided by at least one of the plurality of first storage devices based on an access status of a first region in the thin provisioning LU, and
change an allocation to the first region from the first pool area to a fourth pool area so that a write data to the first region is stored in the storage area provided by the at least one of the plurality of the first storage devices.

7. The storage system according to claim 6, wherein the data having an access frequency larger than a predetermined value is copied.

8. The storage system according to claim 6, wherein the data having an elapsed time from the last access time smaller than a predetermined value is copied.

9. The storage system according to claim 1, wherein the second controller is configured to further provide another external thin provisioning LU which is inhibited to be allocated to the first storage system, and wherein the first controller is configured not to map the another external thin provisioning LU to the pool areas provided by the first controller.

10. A method used in a first storage system coupled to a computer and a second storage system coupled to the first storage system, wherein the first storage system includes a first controller and a plurality of first storage devices, and the second storage system includes a second controller and a plurality of second storage devices, the method comprising:
the first controller providing a thin provisioning logical volume (LU) to the computer;
the first controller providing pool areas, which are associated with the thin provisioning LU, including a first pool area mapped to an external thin provisioning LU;
the first controller allocating the first pool area to a first region in the thin provisioning LU to store a write data to the first region in the thin provisioning LU from the computer;
the second controller providing the external thin provisioning LU to the first storage system; and
the second controller allocating at least one of a plurality of external pool areas, which are provided by at least one of the second storage devices, and associated with the external thin provisioning LU, to store the write data to the first region in the thin provisioning LU.

11. The method according to claim 10, wherein the pool areas associated with the thin provisioning LU include a second pool area mapped to a storage area provided by at least one of the plurality of first storage devices, the method further comprising the first controller allocating the second pool area to store a write data to a second region in the thin provisioning LU from the computer.

12. The method according to claim 11, further comprising the first controller:
copying data from the storage area, mapped to the second pool area, provided by at least one of the plurality of first physical devices, to a storage area provided by the at least one of the second storage devices based on an access status of a second region in the thin provisioning LU; and
changing an allocation to the second region from the second pool area to a third pool area so that the write data to the second region is stored in the storage area provided by the at least one of the second storage devices.

13. The method according to claim 12, wherein the data having an access frequency less than a predetermined value is copied.

14. The method according to claim 12, wherein the data having an elapsed time from the last access time larger than a predetermined value is copied.

15. The method according to claim 10, further comprising the first controller:
copying data from the storage area, which is provided by at least one of the plurality of the second storage devices, and corresponds to a first pool area allocated to a first region in the thin provisioning LU, to a storage area provided by at least one of the plurality of first storage devices based on an access status of a first region in the thin provisioning LU, and
changing an allocation to the first region from the first pool area to a fourth pool area so that a write data to the first region is stored in the storage area provided by the at least one of the plurality of the first storage devices.

16. The method according to claim 15, wherein the data having an access frequency larger than a predetermined value is copied.

17. The method according to claim 15, wherein the data having an elapsed time from the last access time smaller than a predetermined value is copied.

18. The method according to claim 10, wherein the second controller further provides another external thin provisioning LU which is inhibited to be allocated to the first storage system, and wherein the first controller is configured not to map the another external thin provisioning LU to the pool areas provided by the first controller.

* * * * *